(12) United States Patent
Yamamoto et al.

(10) Patent No.: US 7,978,905 B2
(45) Date of Patent: Jul. 12, 2011

(54) CALCULATION PROCESSING APPARATUS AND CONTROL METHOD THEREOF

(75) Inventors: Takahisa Yamamoto, Kawasaki (JP);
Masami Kato, Sagamihara (JP);
Yoshinori Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/602,628

(22) PCT Filed: Jun. 11, 2008

(86) PCT No.: PCT/JP2008/061083
§ 371 (c)(1),
(2), (4) Date: Apr. 20, 2010

(87) PCT Pub. No.: WO2008/153196
PCT Pub. Date: Dec. 18, 2008

(65) Prior Publication Data
US 2010/0215253 A1    Aug. 26, 2010

(30) Foreign Application Priority Data

Jun. 13, 2007    (JP) .................................. 2007-156734

(51) Int. Cl.
*G06K 9/62*    (2006.01)
(52) U.S. Cl. ........................................................ 382/156
(58) Field of Classification Search .................. 382/156, 382/226; 706/15, 27
See application file for complete search history.

(56) References Cited

U.S. PATENT DOCUMENTS

| | | | | |
|---|---|---|---|---|
| 5,220,559 | A | 6/1993 | Tsuzuki et al. | 700/4 |
| 6,038,337 | A | 3/2000 | Lawrence et al. | 382/156 |
| 6,546,471 | B1 * | 4/2003 | Tarui et al. | 711/148 |
| 7,039,233 | B2 | 5/2006 | Mori et al. | 382/181 |

FOREIGN PATENT DOCUMENTS

| | | |
|---|---|---|
| JP | 2-064787 | 3/1990 |
| JP | 3-055658 | 3/1991 |
| JP | 10-021406 | 1/1998 |
| JP | 10-162120 | 6/1998 |
| JP | 11-184841 | 7/1999 |
| JP | 2002-358500 | 12/2002 |
| JP | 2003-281518 | 3/2003 |
| JP | 2004-101910 | 2/2004 |

OTHER PUBLICATIONS

K Korekado et al., "An Image Filtering Processor for Face/Object Recognition Using Merged/Mixed Analog-Digital Architecture", *2005 Symposium on VLSI Circuits Digest of Technical Papers*, pp. 220-223 (2005).

* cited by examiner

*Primary Examiner* — Daniel G Mariam
(74) *Attorney, Agent, or Firm* — Fitzpatrick, Cella, Harper & Scinto

(57) ABSTRACT

A calculation processing apparatus, which executes calculation processing based on a network composed by hierarchically connecting a plurality of processing nodes, assigns a partial area of a memory to each of the plurality of processing nodes, stores a calculation result of a processing node in a storable area of the partial area assigned to that processing node, and sets, as storable areas, areas that store the calculation results whose reference by all processing nodes connected to the subsequent stage of that processing node is complete. The apparatus determines, based on the storage states of calculation results in partial areas of the memory assigned to the processing node designated to execute the calculation processing of the processing nodes, and to processing nodes connected to the previous stage of the designated processing node, whether or not to execute a calculation of the designated processing node.

20 Claims, 21 Drawing Sheets

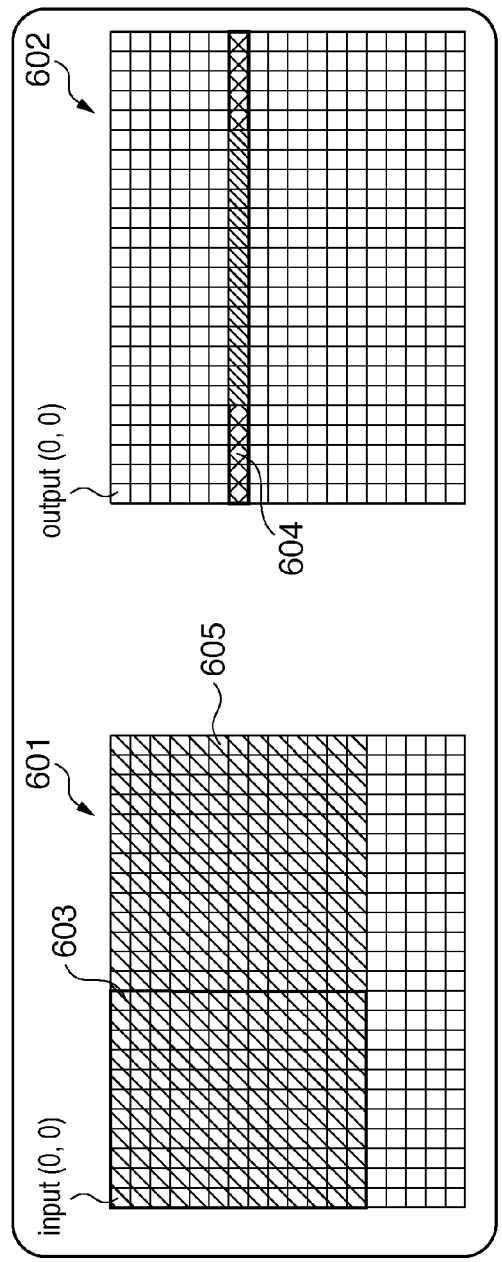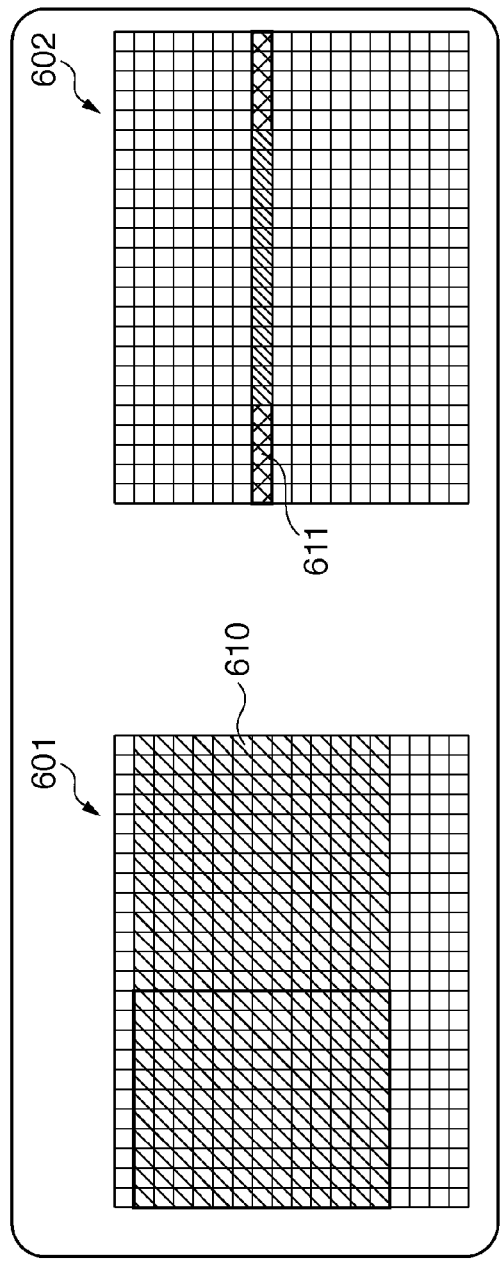
FIG. 4A
FIG. 4B

F I G. 6
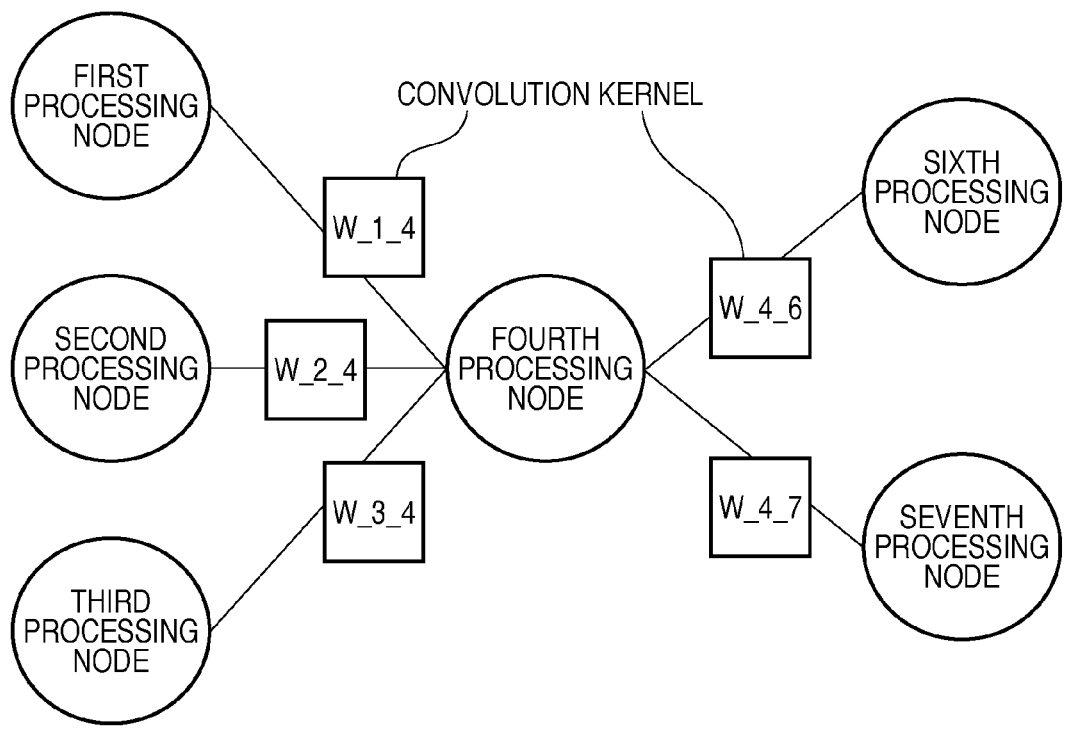

| TARGET PROCESSING NODE | ADJACENT LOWER LAYER PROCESSING NODE | READ COUNTER VALUE | WRITE COUNTER VALUE | OFFSET ADDRESS | NUMBER OF STORABLE LINES | NUMBER OF CALCULATION EXECUTION THRESHOLD LINES |
|---|---|---|---|---|---|---|
| ZEROTH PROCESSING NODE | / | / | ZEROTH PROCESSING NODE ASSIGNED RING BUFFER WRITE COUNTER VALUE (WA0) | / | / | / |
| FIRST PROCESSING NODE | ZEROTH PROCESSING NODE | FIRST PROCESSING NODE CALCULATION READ COUNTER VALUE (WRA0_1) OF ZEROTH PROCESSING NODE RING BUFFER | FIRST PROCESSING NODE ASSIGNED RING BUFFER WRITE COUNTER VALUE (WA1) | FIRST PROCESSING NODE ASSIGNED RING BUFFER OFFSET ADDRESS (OA1) | BH1 | WH1 |
| SECOND PROCESSING NODE | ZEROTH PROCESSING NODE | SECOND PROCESSING NODE CALCULATION READ COUNTER VALUE (WRA0_2) OF ZEROTH PROCESSING NODE RING BUFFER | SECOND PROCESSING NODE ASSIGNED RING BUFFER WRITE COUNTER VALUE (WA2) | SECOND PROCESSING NODE ASSIGNED RING BUFFER OFFSET ADDRESS (OA2) | BH2 | WH2 |
| THIRD PROCESSING NODE | ZEROTH PROCESSING NODE | THIRD PROCESSING NODE CALCULATION READ COUNTER VALUE (WRA0_3) OF ZEROTH PROCESSING NODE RING BUFFER | THIRD PROCESSING NODE ASSIGNED RING BUFFER WRITE COUNTER VALUE (WA3) | THIRD PROCESSING NODE ASSIGNED RING BUFFER OFFSET ADDRESS (OA3) | BH3 | WH3 |

FIG. 8B

| | | | | | | |
|---|---|---|---|---|---|---|
| FOURTH PROCESSING NODE | FIRST PROCESSING NODE | FOURTH PROCESSING NODE CALCULATION READ COUNTER VALUE (WRA1_4) OF FIRST PROCESSING NODE RING BUFFER | FOURTH PROCESSING NODE ASSIGNED RING BUFFER WRITE COUNTER VALUE (WA4) | FOURTH PROCESSING NODE ASSIGNED RING BUFFER OFFSET ADDRESS (OA4) | BH4 | WH4 |
| | SECOND PROCESSING NODE | FOURTH PROCESSING NODE CALCULATION READ COUNTER VALUE (WRA2_4) OF SECOND PROCESSING NODE RING BUFFER | | | | |
| | THIRD PROCESSING NODE | FOURTH PROCESSING NODE CALCULATION READ COUNTER VALUE (WRA3_4) OF THIRD PROCESSING NODE RING BUFFER | | | | |
| FIFTH PROCESSING NODE | FIRST PROCESSING NODE | FIFTH PROCESSING NODE CALCULATION READ COUNTER VALUE (WRA1_5) OF FIRST PROCESSING NODE RING BUFFER | FIFTH PROCESSING NODE ASSIGNED RING BUFFER WRITE COUNTER VALUE (WA5) | FIFTH PROCESSING NODE ASSIGNED RING BUFFER OFFSET ADDRESS (OA5) | BH5 | WH5 |
| | SECOND PROCESSING NODE | FIFTH PROCESSING NODE CALCULATION READ COUNTER VALUE (WRA2_5) OF SECOND PROCESSING NODE RING BUFFER | | | | |
| | THIRD PROCESSING NODE | FIFTH PROCESSING NODE CALCULATION READ COUNTER VALUE (WRA3_5) OF THIRD PROCESSING NODE RING BUFFER | | | | |

FIG. 8C

| | | | | |
|---|---|---|---|---|
| SIXTH PROCESSING NODE | FOURTH PROCESSING NODE | SIXTH PROCESSING NODE CALCULATION READ COUNTER VALUE (WRA4_6) OF FOURTH PROCESSING NODE RING BUFFER | SIXTH PROCESSING NODE ASSIGNED RING BUFFER WRITE COUNTER VALUE (WA6) | SIXTH PROCESSING NODE ASSIGNED RING BUFFER OFFSET ADDRESS (OA6) | |
| | FIFTH PROCESSING NODE | SIXTH PROCESSING NODE CALCULATION READ COUNTER VALUE (WRA5_6) OF FIFTH PROCESSING NODE RING BUFFER | | | BH6 | WH6 |
| SEVENTH PROCESSING NODE | FOURTH PROCESSING NODE | SEVENTH PROCESSING NODE CALCULATION READ COUNTER VALUE (WRA4_7) OF FOURTH PROCESSING NODE RING BUFFER | SEVENTH PROCESSING NODE ASSIGNED RING BUFFER WRITE COUNTER VALUE (WA7) | SEVENTH PROCESSING NODE ASSIGNED RING BUFFER OFFSET ADDRESS (OA7) | |
| | FIFTH PROCESSING NODE | SEVENTH PROCESSING NODE CALCULATION READ COUNTER VALUE (WRA5_7) OF FIFTH PROCESSING NODE RING BUFFER | | | BH7 | WH7 |
| EIGHTH PROCESSING NODE | SIXTH PROCESSING NODE | EIGHTH PROCESSING NODE CALCULATION READ COUNTER VALUE (WRA6_8) OF SIXTH PROCESSING NODE RING BUFFER | EIGHTH PROCESSING NODE ASSIGNED RING BUFFER WRITE COUNTER VALUE (WA8) | EIGHTH PROCESSING NODE ASSIGNED RING BUFFER OFFSET ADDRESS (OA8) | |
| | SEVENTH PROCESSING NODE | EIGHTH PROCESSING NODE CALCULATION READ COUNTER VALUE (WRA7_8) OF SEVENTH PROCESSING NODE RING BUFFER | | | BH8 | WH8 |

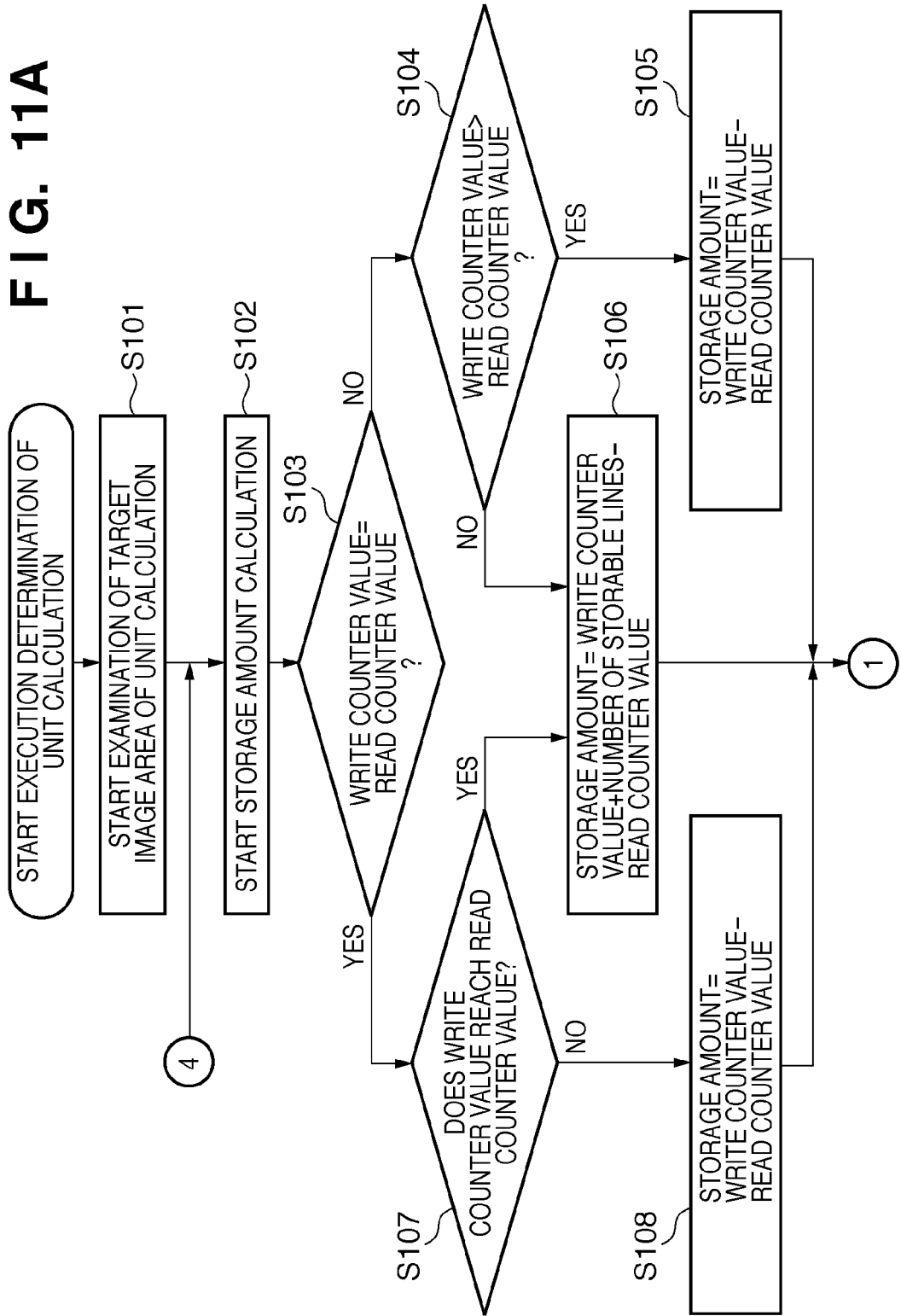

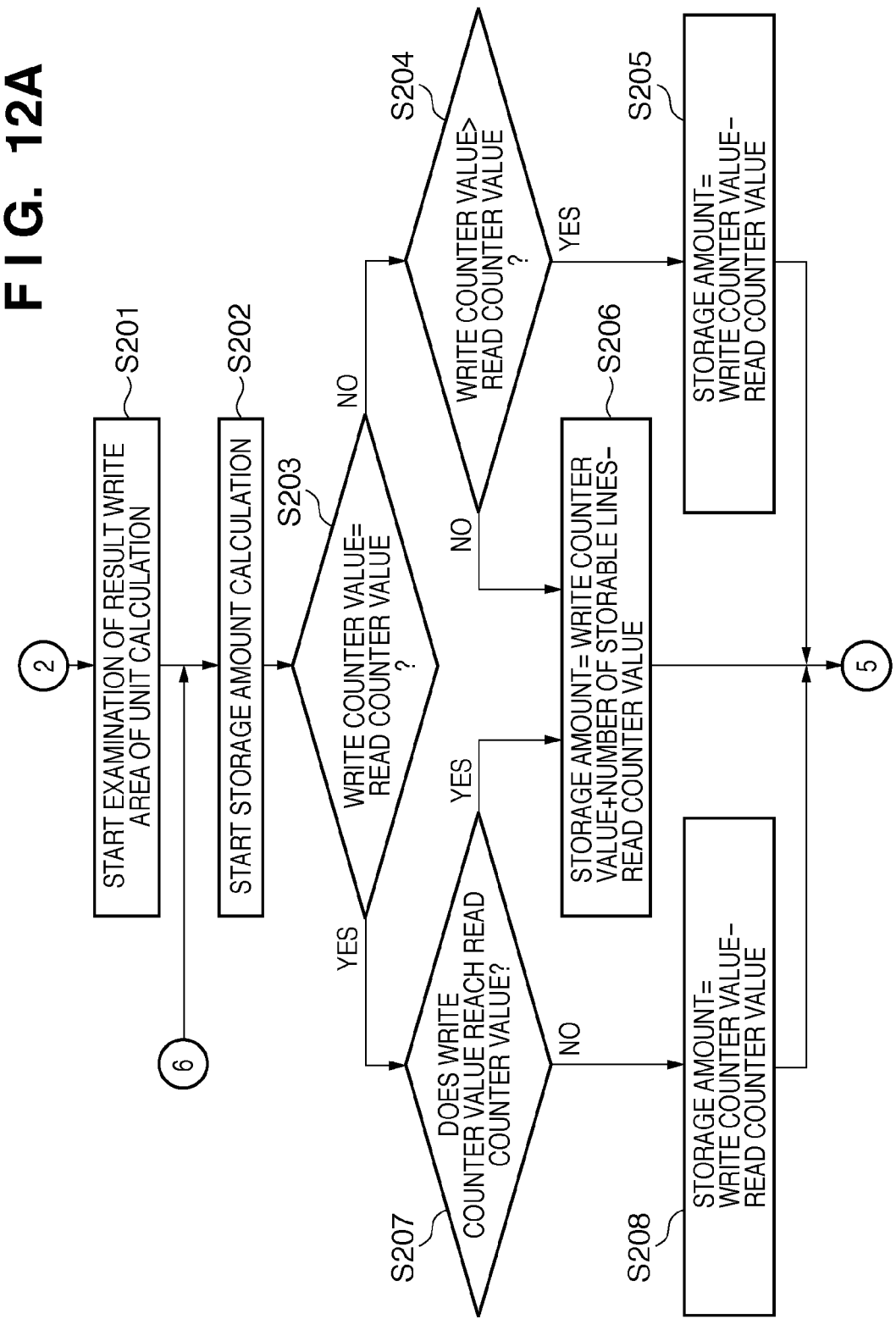

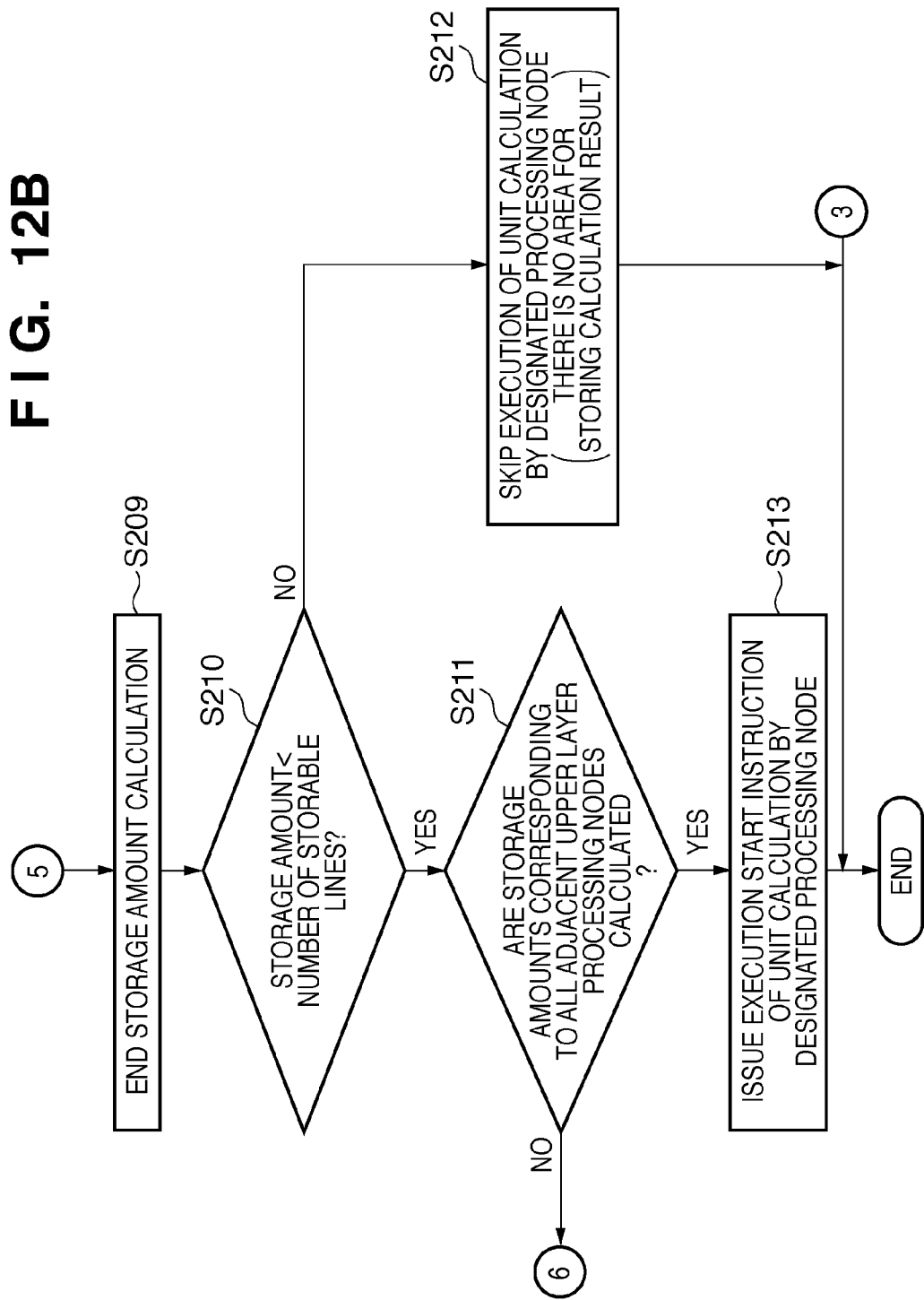

CALCULATION PROCESSING APPARATUS AND CONTROL METHOD THEREOF

TECHNICAL FIELD

The present invention relates to a hierarchical calculation processing method and apparatus, which are applied to a pattern identification apparatus, pattern identification system, hierarchical filter calculation processing apparatus, and the like.

BACKGROUND ART

As applications to a pattern identification system, prediction system, control system, and the like, a signal processing apparatus using a neural network is prevalently used. The neural network is often implemented as software which runs on a microprocessor, and is provided as application software for a personal computer, workstation, and the like.

FIG. 14 is a schematic diagram showing an example of the arrangement of an image processing apparatus using a general layer-interconnected neural network. Referring to FIG. 14, reference numeral 21 denotes detection target data, for example, raster-scanned image data. Reference numeral 22 denotes a calculation unit which detects a predetermined object from an image, and comprises a neural network of three layers in the example of FIG. 14. Reference numeral 23 denotes an output data plane corresponding to the calculation result. The calculation unit 22 executes processing while scanning and referring to a predetermined image area 24, thereby detecting a detection target which exists in the image. The output data plane 23 is an image plane having the same size as the image data 21 as the detection target, and stores detection outputs obtained when the calculation unit 22 processes all the areas of the image data 21 while scanning them. Since the calculation unit 22 outputs a large value at a position where a target is detected, it can recognize the position of the target in the image plane by scanning the output data plane 23. In the calculation unit 22, reference numerals 25, 26, and 27 denote layers of the neural network, and a predetermined number of neurons 28 exist in each layer. The first layer 25 has the same number of nodes, that is, neurons 28 as the number of pixels of a reference image. Respective neurons are feed-forward-interconnected via predetermined weighting coefficients. FIG. 15 shows the arrangement of one neuron 28. Reference numerals in_1 to in_n denote input values to this processing node, which are detection target image data in the first layer, and neuron output values of the previous layer in the second and subsequent layers. Multipliers 31a, 31b, ..., 31n output products obtained by multiplying the output values of the respective previous layer neurons by coefficients $w_1$ to $w\_n$ obtained by learning. An accumulation adder 32 accumulates the products from the multipliers 31a, 31b, ..., 31n. A nonlinear transformation processing unit 33 nonlinearly transforms the accumulated sum of the accumulation adder 32 using a logistic function, hyperbolic tangent function (tan h function), or the like, and outputs that result as a detection result "out". In the hierarchical neural network, the weighting coefficients w_1 to w_n required for respective neurons are determined in advance in accordance with a detection target using a learning algorithm such as back propagation, or the like, which is generally known.

For the purpose of low-cost implementation of such layer-interconnected neural network in an embedded device or the like, an implementation method using analog hardware or digital hardware has been proposed. For example, Japanese Patent No. 2679730 (patent reference 1) discloses an architecture of a hierarchical structure neural network which implements a multilayered structure using single-layer analog neural network hardware as time division multiplexing. Also, Japanese Patent Laid-Open No. 03-055658 (patent reference 2) discloses an implementation method using digital hardware.

On the other hand, a calculation method called Convolutional Neural Networks (to be abbreviated as CNN hereinafter) of neural networks is known as a method that allows pattern recognition robust against variations of an identification target. For example, Japanese Patent Laid-Open No. 10-021406 (patent reference 3) and Japanese Patent Laid-Open No. 2002-358500 (patent reference 4) have proposed examples applied to target identification or detection in an image.

FIG. 16 shows the logical network composition as an example of simple CNN. FIG. 16 shows an example of three-layer CNN in which the number of features of a first layer 406 is 3, that of a second layer 410 is 2, and that of a third layer 411 is 1. Reference numeral 401 denotes image data, which corresponds to raster-scanned image data. Reference numerals 403a to 403c denote feature planes of the first layer 406. The feature plane is an image data plane indicating the calculation result while scanning data of the previous layer using a predetermined feature extraction filter (the accumulated sum of convolution calculations and nonlinear processing). Since the feature plane is the detection result for the raster-scanned image data, the detection result is also expressed by a plane. The feature planes 403a to 403c are generated from the image data 401 by corresponding feature extraction filters. For example, the feature planes 403a to 403c are generated by two-dimensional convolution filter calculations corresponding to convolution filter kernels 404a to 404c, and the non-linear transformation of the calculation results. Note that reference numeral 402 denotes a reference image area required for the convolution calculations.

For example, a convolution filter calculation having a kernel size (the length in the horizontal direction and the height in the vertical direction) of 11×11 processes data by a product-sum calculation given by:

$$\text{output}(x, y) = \sum_{row=0}^{rowSize} \sum_{column=0}^{columnSize} \text{input}(x + \text{column}, y + \text{row}) \times \text{weight}(\text{column}, \text{row}) \quad (1)$$

where
input (x, y): a reference pixel value at coordinates (x, y)
output (x, y): a calculation result at coordinates (x, y)
weight (column, row): a weighting coefficient at coordinates (x+column, y+row)
columnSize=11, rowSize=11: a convolution filter kernel size (the number of filter taps).

Reference numerals 404a to 404c denote convolution filter kernels having different coefficients. Also, the convolution filter kernels have different sizes depending on the feature planes. The convolution filter kernels will be referred to as convolution kernels hereinafter.

The CNN calculations generate the feature plane by repeating the product-sum calculation while scanning a plurality of filter kernels for respective pixels, and by nonlinearly transforming the final product-sum result. Upon calculating the feature plane 403a, since the number of interconnections with the previous layer is 1, the number of filter kernels is 1 (404a).

On the other hand, upon calculating each of feature planes 407a and 407b, since the number of interconnections with the previous layer (first layer 406) is 3, the calculation results of three convolution filters corresponding to convolution kernels 409a to 409c or 409d to 409f are accumulated. The convolution kernels 409a to 409f have different filter coefficients. The convolution kernels 409a to 409c and the convolution kernels 409d to 409f have different kernel, sizes, as shown in FIG. 16. For example, the feature plane 407a can be generated by accumulating the outputs from the convolution kernels 409a to 409c, and finally executing the nonlinear transformation processing of the result.

The basic arrangement of the accumulation of convolution kernels (convolution filters) and the nonlinear transformation processing is the same as that of the neuron shown in FIG. 15. That is, the coefficients of the convolution kernel corresponds to the weighting coefficients w_1 to w_n. Upon interconnecting to the feature planes of a plurality of previous layers like the feature planes 407a, 407b, and 408, the accumulation adder 32 accumulates a plurality of convolution kernel calculation results. That is, the total number of interconnections corresponds to the convolution kernel size×the number of features of the previous layer.

FIG. 17 is a view for explaining graphic detection processing in the CNN calculations. Reference numerals 51a to 51c denote convolution kernels which illustrate feature extraction targets of the first layer, and are learned to respectively extract a horizontal edge and oblique edges. Reference numerals 52a and 52b denote graphics determined based on the extraction results of a plurality of first layer features (primary features) and their spatial allocation relationships. Reference numeral 53 denotes a graphic to be finally extracted (ternary feature in this example). The graphic 53 is determined based on the extraction results of a plurality of second layer features (secondary features) and their spatial allocation relationship. Assume that the respective filter coefficients of the convolution kernels are determined for respective features by learning using a prevalent method such as perceptron learning, back propagation learning, or the like. In object detection, recognition, and the like, a filter kernel having a size as large as 10×10 or more is normally used. In general, convolution kernel sizes are different for respective features.

In this way, in the CNN calculations, by hierarchically interconnecting layers while holding the results by respective image planes for respective feature extractions, robust pattern detection based on primitive features and their spatial allocation relationships can be implemented.

As has been described using FIG. 14, in an apparatus for detecting an object in an image, which uses a general hierarchical neutral network, as the memory size required for calculation processing, a buffer memory used to hold neuron outputs suffices except for input and output image buffers. That is, if a memory having the predetermined number of bits as many as the number of neurons is provided, desired calculation processing can be executed.

On the other hand, in case of the CNN calculations, since feature extraction is made based on the spatial allocation of a plurality of feature extraction results of the previous layer, data buffers of a predetermined size are required between adjacent layers. For example, in case of the CNN calculation configuration shown in FIG. 16, an image size×five feature plane buffer memories are required in addition to input and output image buffers. For this reason, a memory size required for processing becomes larger than a general hierarchical neural network.

The methods disclosed in patent references 3 and 4 described above are also those which hold the feature extraction results by image planes, and the memory size required for processing is larger than a general hierarchical neural network.

Particularly, upon hardware implementation of the CNN calculations, a RAM (Random Access Memory) having a large size needs to be prepared in an LSI, resulting in increases in circuit scale and cost. Even upon software implementation of the CNN calculations, if it is implemented in an embedded device, the cost similarly increases due to an increase in memory size required for the system.

DISCLOSURE OF INVENTION

The present invention has been made to solve such problems, and one typical embodiment provides a method and circuit, which implement, using a small memory size, hierarchical calculation processing based on the spatial allocation relationship such as the CNN calculations and the like.

According to one aspect of the present invention, there is provided a calculation processing apparatus, which executes calculation processing based on a network composed by hierarchically connecting a plurality of processing nodes, the apparatus comprising:

memory control means for assigning a partial area of a memory to each of the plurality of processing nodes, storing a calculation result of each processing node in a storable area of the partial area assigned to that processing node, and setting, as storable areas, areas that store the calculation results whose reference by all processing nodes connected to a subsequent stage of that processing node is complete;

designation means for designating a processing node, which is to execute calculation processing, of the plurality of processing nodes;

determination means for determining, based on storage states of calculation results in partial areas of the memory assigned to the processing node designated by the designation means and to processing nodes connected to a previous stage of the designated processing node, whether or not to execute a calculation of the designated processing node; and execution means for, when the determination means determines that the calculation is executed, controlling to execute calculation processing corresponding to the designated processing node.

According to another aspect of the present invention, there is provided a method of controlling a calculation processing apparatus, which executes calculation processing based on a network composed by hierarchically connecting a plurality of processing nodes, the method comprising:

a memory control step of assigning a partial area of a memory to each of the plurality of processing nodes, storing a calculation result of each processing node in a storable area of the partial area assigned to that processing node, and setting, as storable areas, areas that store the calculation results whose reference by all processing nodes connected to a subsequent stage of that processing node is complete;

a designation step of designating a processing node, which is to execute calculation processing, of the plurality of processing nodes;

a determination step of determining, based on storage states of calculation results in partial areas of the memory assigned to the processing node designated in the designation step and to processing nodes connected to a previous stage of the designated processing node, whether or not to execute a calculation of the designated processing node; and an execution step of controlling, when it is determined in the determination step that the calculation is executed, to execute calculation processing corresponding to the designated processing node.

Further features of the present invention will become apparent from the following description of exemplary embodiments with reference to the attached drawings.

BRIEF DESCRIPTION OF DRAWINGS

FIGS. 4A and 4B are views for explaining a unit calculation of each processing node according to the embodiment;

FIG. 6 is a view showing a partial network extracted from a hierarchical network shown in FIG. 3 to have the fourth processing node as the center;

FIGS. 8A, 8B and 8C show an example of the data configuration of a network composition information table;

FIGS. 11A and 11B is a flowchart for explaining the operation of a unit calculation execution determination unit;

FIGS. 12A and 12B is a flowchart for explaining the operation of the unit calculation execution determination unit;

BEST MODE FOR CARRYING OUT THE INVENTION

Exemplary embodiments of the present invention will now be described in detail in accordance with the accompanying drawings.

First Embodiment

Figure 1:
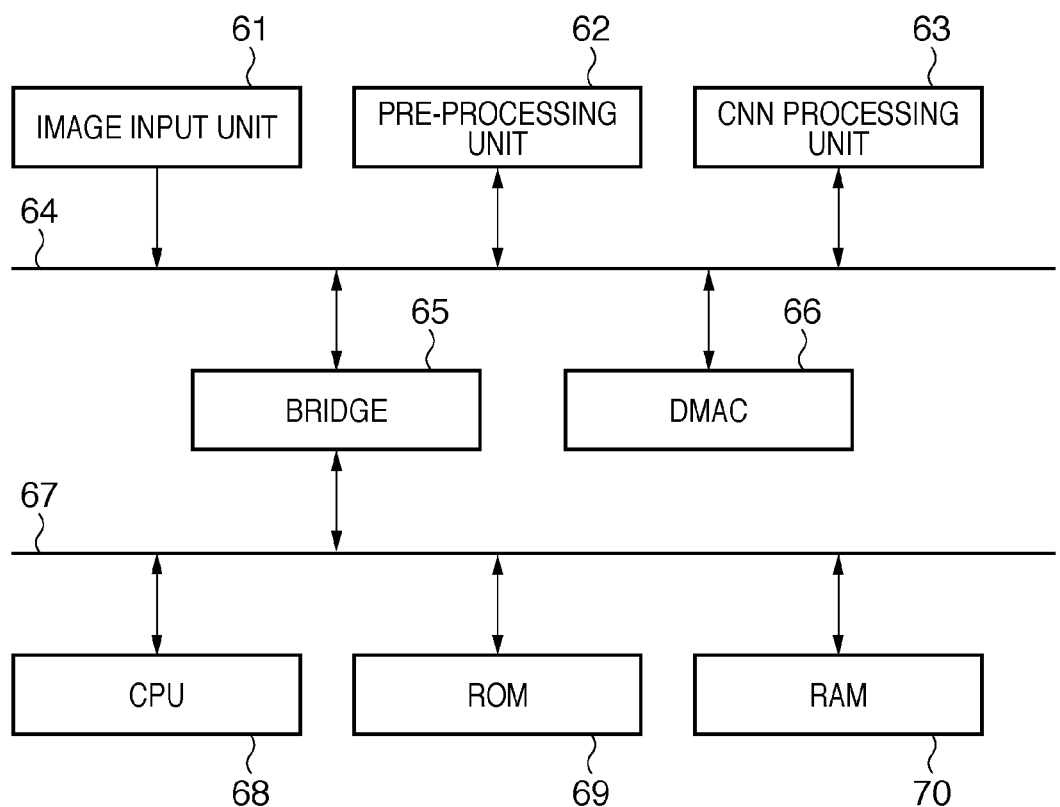
FIG. 1 is a block diagram for explaining an example of the arrangement of an image processing apparatus which uses a hierarchical calculation processing apparatus according to an embodiment.

FIG. 1 is a block diagram showing an example of the arrangement of a pattern detection apparatus, which comprises a hierarchical calculation processing circuit according to the first embodiment. The pattern detection apparatus has a function of detecting a specific object (image pattern) in image data. Referring to FIG. 1, reference numeral 61 denotes an image input unit, which comprises an optical system and a photoelectric conversion device such as a CCD (Charge-Coupled Device) or CMOS (Complementary Metal Oxide Semiconductor) sensor, or the like. Furthermore, the image input unit 61 includes a driver circuit for controlling the CCD or CMOS sensor, an AD converter, a signal processing circuit for controlling various kinds of image correction, a frame buffer, and the like. Reference numeral 62 denotes a pre-processing unit, which executes various kinds of pre-processing required to efficiently execute detection processing of graphics and the like from an image. More specifically, the pre-processing unit 62 processes image data conversion such as color conversion processing, contrast correction processing, and the like by hardware. A CNN processing unit 63 is a feature detection processing unit including a hierarchical calculation processing apparatus. Details of the CNN processing unit 63 will be described later with reference to FIG. 2.

Reference numeral 66 denotes a DMAC (Direct Memory Access Controller), which controls data transfer between the respective processing units on an image bus 64 and that between devices on the image bus 64 and a RAM 70 on a CPU bus 67. Reference numeral 65 denotes a bridge, which provides a bridge function between the image bus 64 and CPU bus 67. Reference numeral 68 denotes a CPU, which controls the operation of this apparatus as a whole. Reference numeral 69 denotes a ROM (Read Only Memory), which stores instructions that specify the operations of the CPU 68 and parameter data required for various calculations. For example, the ROM 69 stores weighting coefficients, network interconnection information, sequence information, and the like required for the operation of the CNN processing unit 63. Reference numeral 70 denotes a RAM (Random Access Memory) which functions as a main memory necessary for the operation of the CPU 68 and comprises a memory having a relatively large capacity such as a DRAM (Dynamic RAM) or the like. The CPU 68 can access various processing units on the image bus 64 via the bridge 65. By isolating the image bus 64 and CPU bus 67, the operations of the hardware components 61 to 63 and that of the CPU 68 can be executed simultaneously, that is, parallelly.

Figure 2:
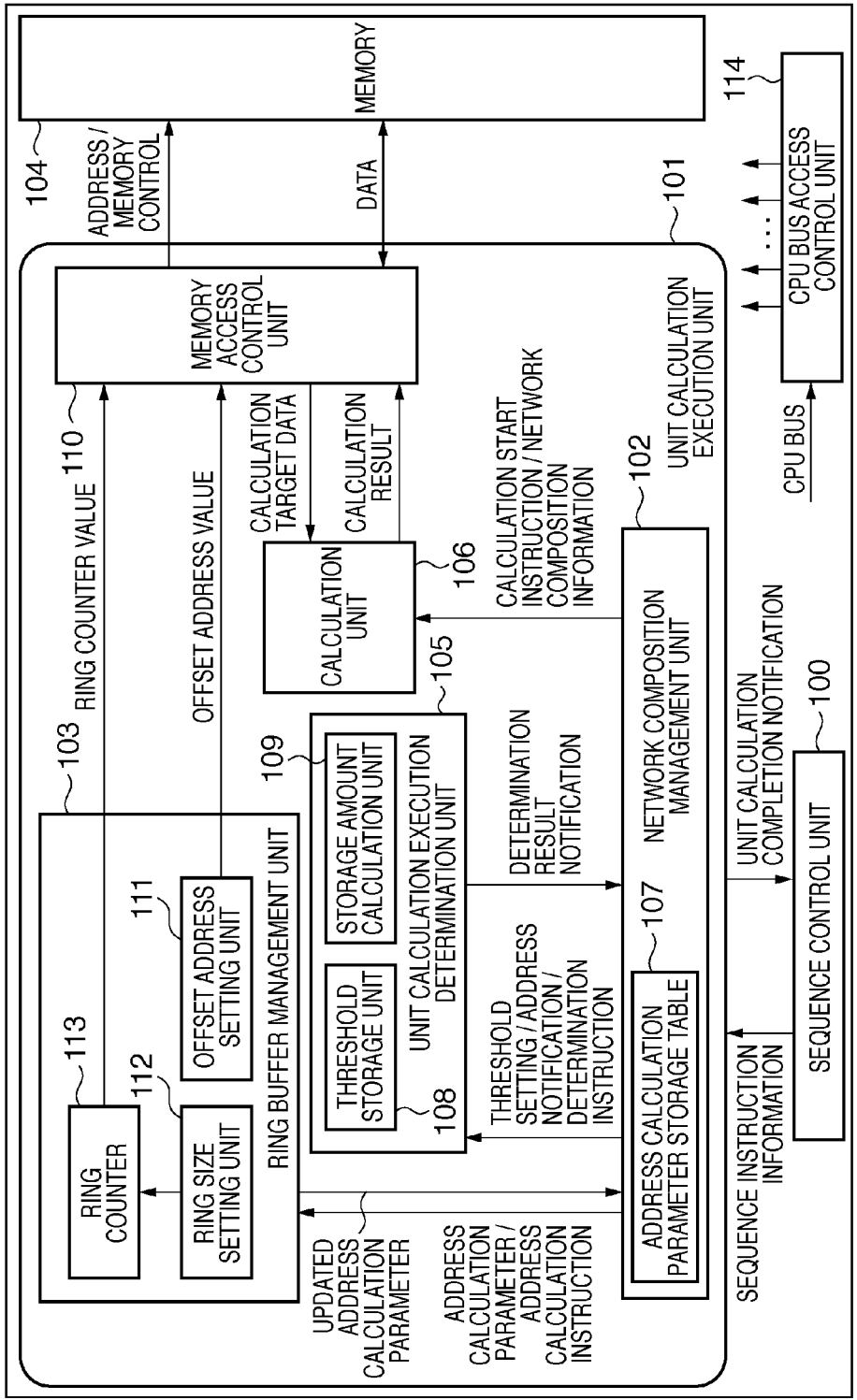
FIG. 2 is a block diagram showing an example of the arrangement of the hierarchical calculation processing apparatus according to the first embodiment.

FIG. 2 is a block diagram showing an example of the arrangement of the hierarchical calculation processing apparatus in the CNN processing unit 63 of the first embodiment.

Figure 3:
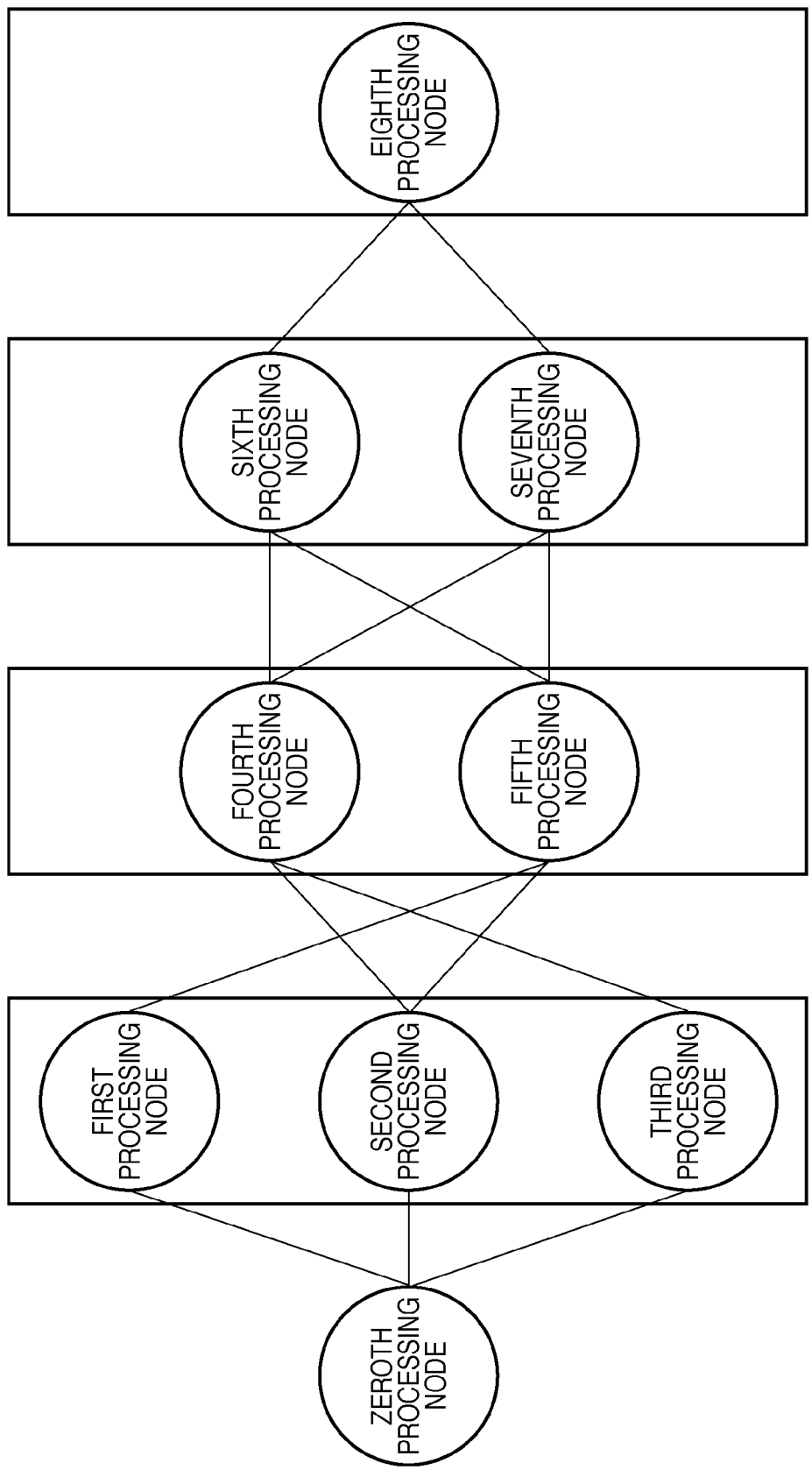
FIG. 3 is a view for explaining the logical connection configuration of processing nodes.

The hierarchical calculation processing apparatus shown in FIG. 2 is used to execute hierarchical calculations shown in, for example, FIG. 3. In FIG. 3, a processing node indicates a block which executes processing for obtaining a convolution calculation result from a convolution calculation target image and convolution kernels. Note that the zeroth processing node is provided in FIG. 3 for the sake of convenience. However, the zeroth processing node does not particularly execute any processing, and an input image is input to the first to third processing nodes. For example, the fourth processing node in FIG. 3 executes convolution calculations by applying convolution kernels having different coefficients to the outputs from the first to third processing nodes. Then, the fourth processing node adds the respective convolution calculation results, and executes nonlinear transformation to obtain a calculation result. Furthermore, the calculation result of the fourth processing node is input to the sixth and seventh processing nodes.

Upon applying the hierarchical calculation processing apparatus shown in FIG. 2 to the CNN shown in FIG. 3, the hierarchical calculation processing apparatus shown in FIG. 2 is time-sharing system used between the processing nodes, thus executing calculations specified in the respective processing nodes. For example, the CNN calculations are executed like that the calculation specified in the first node is made using the hierarchical calculation processing apparatus, and that specified in the second processing node is then made.

That is, a plurality of processing nodes which compose the CNN exist to form a logical network, but only one hierarchical calculation processing apparatus which executes calculations specified in the processing nodes exists physically. Of course, a plurality of hierarchical calculation processing apparatuses may be configured to be used.

Referring to FIG. 2, reference numeral 114 denotes a CPU bus access control unit, which is a bus interface required for the CPU 68 to access various registers and a memory 104 in the CNN processing unit 63. For example, various setting data such as an address calculation parameter storage table 107 in a network composition management unit 102, weighting coefficient set 1205 (to be described later with reference to FIG. 10) in a calculation unit 106, and the like are written via that interface.

In FIG. 2, a sequence control unit 100 outputs sequence instruction information to a unit calculation execution unit 101 in accordance with calculation order information set in advance. In this embodiment, as described above, the hierarchical calculation processing apparatus executes calculations specified in the respective processing nodes in a time-sharing fashion. Therefore, the sequence control unit 100 controls the order of calculations specified in the respective processing nodes by the unit calculation execution unit 101.

The sequence control unit 100 instructs to cyclically execute all the processing nodes which compose the hierarchical calculation network. For example, upon execution of the CNN shown in FIG. 3 by the hierarchical calculation processing apparatus of this embodiment, the sequence control unit 100 instructs the unit calculation execution unit 101 to cyclically execute the respective processing nodes like:

"calculation specified in the first processing node→that specified in the second processing node→ . . . →that specified in the eighth processing node→that specified in the first processing node"

In FIG. 2, the unit calculation execution unit 101 executes the calculation specified in the instructed processing node in accordance with the instruction from the sequence control unit 100. In the unit calculation execution unit 101, a unit upon execution of calculations (to be referred to as a unit calculation hereinafter) is set in advance.

Upon execution of the CNN shown in FIG. 3, the calculation specified in each processing node includes convolution calculations, their addition, and nonlinear transformation of the result, and a series of calculations are executed for the entire input image (entire input data). Note that the addition of the convolution calculation results is executed when convolution calculations are executed for outputs from a plurality of processing nodes like the fourth to eighth processing nodes. Therefore, after the calculations specified in the respective processing nodes are made, the calculation results define a two-dimensional image.

By contrast, the unit calculation here means a calculation for outputting calculation results for one row in the horizontal direction (or for one column in the vertical direction) in the series of calculations, and by repeating this unit calculation, the calculations specified in the respective processing nodes are carried out.

FIGS. 4A and 4B are views for explaining unit calculations executed by the processing nodes. For the sake of simplicity, FIGS. 4A and 4B show a case in which a convolution calculation is made for a calculation output image (or an input image to the network) as a calculation target image (in case of the first to third processing nodes shown in FIG. 3), and nonlinear conversion is omitted.

Referring to FIG. 4A, reference numeral 601 denotes a calculation target image, in which one minimum box indicates a pixel of an input image indicated in a raster scan order or a calculation result pixel in the processing node of the previous layer (input (x, y), x: a horizontal position, y: a vertical position). Reference numeral 602 denotes a calculation result image, in which one minimum box indicates a calculation result pixel in the raster-scan order (output (x, y), x: a horizontal position, y: a vertical position).

A reference image area 603 (an area in the bold frame) is an area of a reference image upon processing the convolution calculations at a position output (6, 7). Note that the reference image area 603 in FIG. 4A indicates a case in which the convolution kernel size is defined by "11" in the horizontal direction and "13" in the vertical direction.

An area 604 in the bold frame in the calculation result image 602 indicates a result area obtained when the unit calculation (calculations for one row in the horizontal direction) is made for the calculation target image 601. Pixels in cross-hatched areas in the result area 604 are those in surrounding areas (areas that do not undergo any calculation) which are generated depending on the convolution kernel size. How to handle these surrounding areas (to delete, to embed a default value, or the like) in the hierarchical processing is not an essential matter in the present invention. In this case, for example, assume that a default value is embedded.

As can be seen from FIG. 4A, upon execution of the unit calculation, an area 605 having a horizontal size which is at least equal to the calculation target image and a vertical size which is equal to that of the convolution kernel is required as a required area of the calculation target image. That is, data of this area 605 serve as processing target data of the unit calculation by the processing node. For the sake of simplicity, this area 605 will be referred to as a unit calculation target image area hereinafter. The convolution calculations can be made for the entire area of the calculation target image 601 by executing the unit calculation indicated by the result area 604 while shifting the unit calculation target area 605. Note that FIG. 4B shows a case in which the unit calculation is made for an image area 610 as a unit calculation target when the unit calculation target image area is shifted for one pixel (for one horizontal line) from the state in FIG. 4A. A result area 611 is also shifted for one pixel down from the result area 604. At this time, whether or not to execute a certain unit calculation depends on whether or not pixel data of an image area as a unit calculation target of that unit calculation have been calculated by the processing node of the previous layer, and that result is output.

Upon completion of the unit calculations designated by the sequence control unit 100, the unit calculation execution unit 101 notifies the sequence control unit 100 of completion of the unit calculations (unit calculation completion notification).

From the above description, when the CNN shown in FIG. 3 is to be executed for respective unit calculations as a unit using the sequence control unit 100 and unit calculation execution unit 101 of this embodiment, the following operations are made.

(1) The sequence control unit 100 instructs the unit calculation execution unit 101 to execute calculations specified in the first processing node as sequence instruction information. After that, the sequence control unit 100 cyclically updates the instruction like "calculation specified in the second processing node→ . . . →that specified in the eighth processing node→that specified in the first processing node" every time it receives a unit calculation completion notification from the unit calculation execution unit 101.

(2) When the unit calculation execution unit 101 receives the sequence instruction information from the sequence control unit 100, a unit calculation execution determination unit 105 determines whether or not the instruction unit calculation can be executed. Note that the operation and determination of this unit calculation execution determination unit 105 will be described later, and the unit 105 uses information indicating whether or not pixel data of an image area as a target of that unit calculation are available as one criterion. When it is determined that the unit calculation can be executed, the unit calculation execution unit 101 executes the calculation specified in the processing node instructed by the instruction information for the unit calculation (for example, for one row in the horizontal direction). Upon completion of the unit calculation, the unit 101 notifies the sequence control unit 100 of completion of the unit calculation. When it is determined that the unit calculation cannot be executed, the unit calculation execution unit 101 skips the corresponding unit calculation, and notifies the sequence control unit 100 of completion of the unit calculation.

Figure 5:
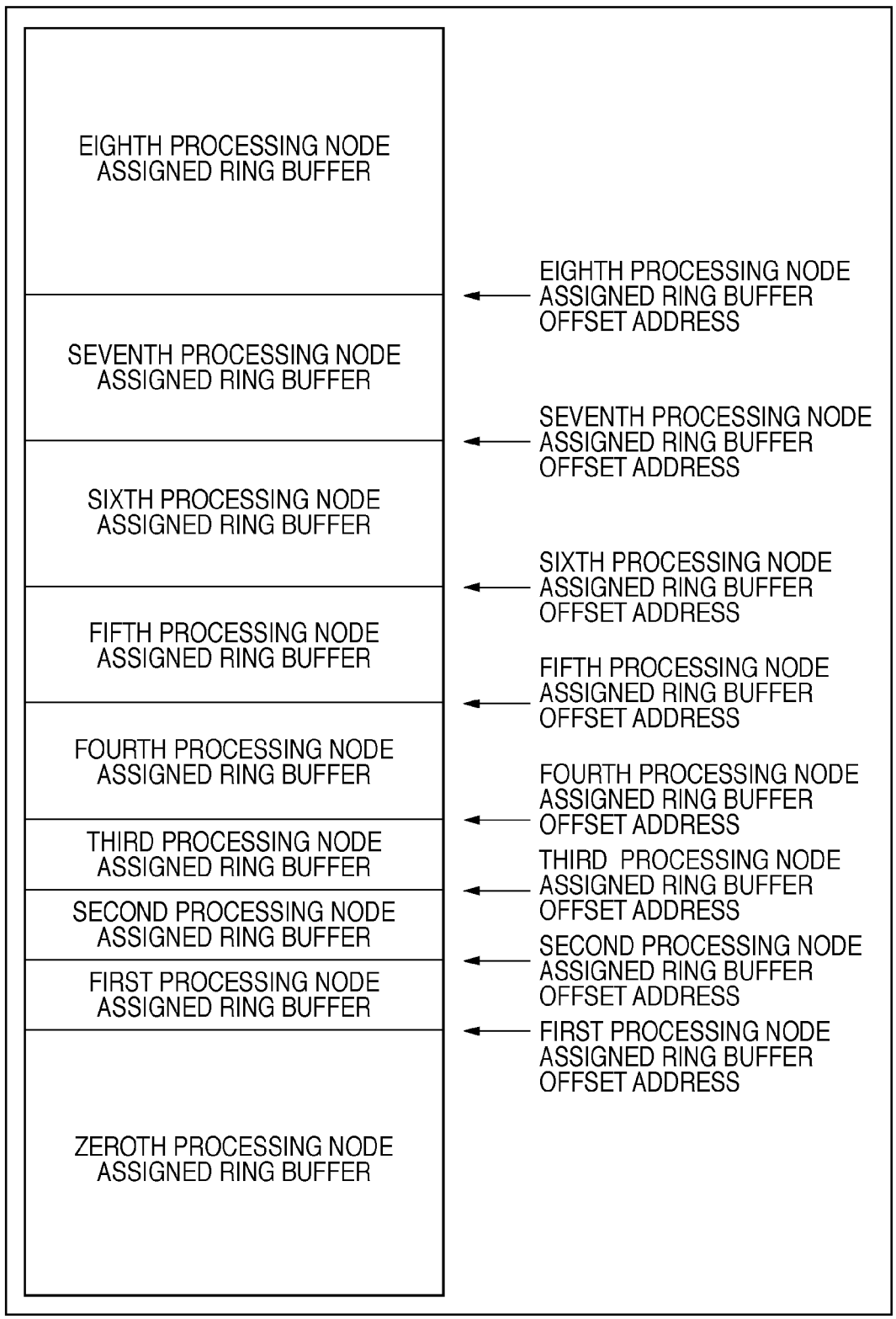
FIG. 5 is a view showing an example associated with memory assignments according to the embodiment.

Referring to FIG. 2, the memory 104 is divided into partial areas assigned to respective processing nodes, and each partial area is used as a ring buffer. FIG. 5 illustrates a state in which the memory 104 is divided into the partial areas upon execution of the hierarchical calculations shown in FIG. 3. For example, upon execution of the calculation corresponding to the fourth processing node shown in FIG. 3, the unit calculation execution unit 101 reads out calculation target data from a first processing node assigned ring buffer, second processing node assigned ring buffer, and third processing node assigned ring buffer of the memory 104. The unit calculation execution unit 101 makes calculations using the readout data, and stores the calculation result in a fourth processing node assigned ring buffer. Note that a position where data is to be read and that where data is to be written in each ring buffer will be described in detail later. Note that, as shown in FIG. 5, it is preferable in terms of efficient use of the memory to assign different address spaces of the memory 104 having a continuous address space to a plurality of processing nodes and to share the memory by these processing nodes.

As described above, in the memory 104, the partial areas assigned to respective processing nodes are used as ring buffers. The (logical) width of each ring buffer at that time is the same as that of the input image. The ring buffer is cyclically overwritten and used for respective lines each having a height "1". Therefore, one line of the ring buffer is updated every time the unit calculation is made.

The network composition management unit 102 manages information that specifies the network composition of the hierarchical calculations to be calculated by the hierarchical calculation processing apparatus of this embodiment. The network composition means the connection relationship among processing nodes, the convolution kernel size used in the calculation processing used in each processing node, and the like.

The address calculation parameter storage table 107 records the network composition information managed by the network composition management unit 102, and address management information required for read and write accesses to the memory 104 that occur upon execution of calculations. The address calculation parameter storage table 107 stores various kinds of information for respective processing nodes.

Figure 7:
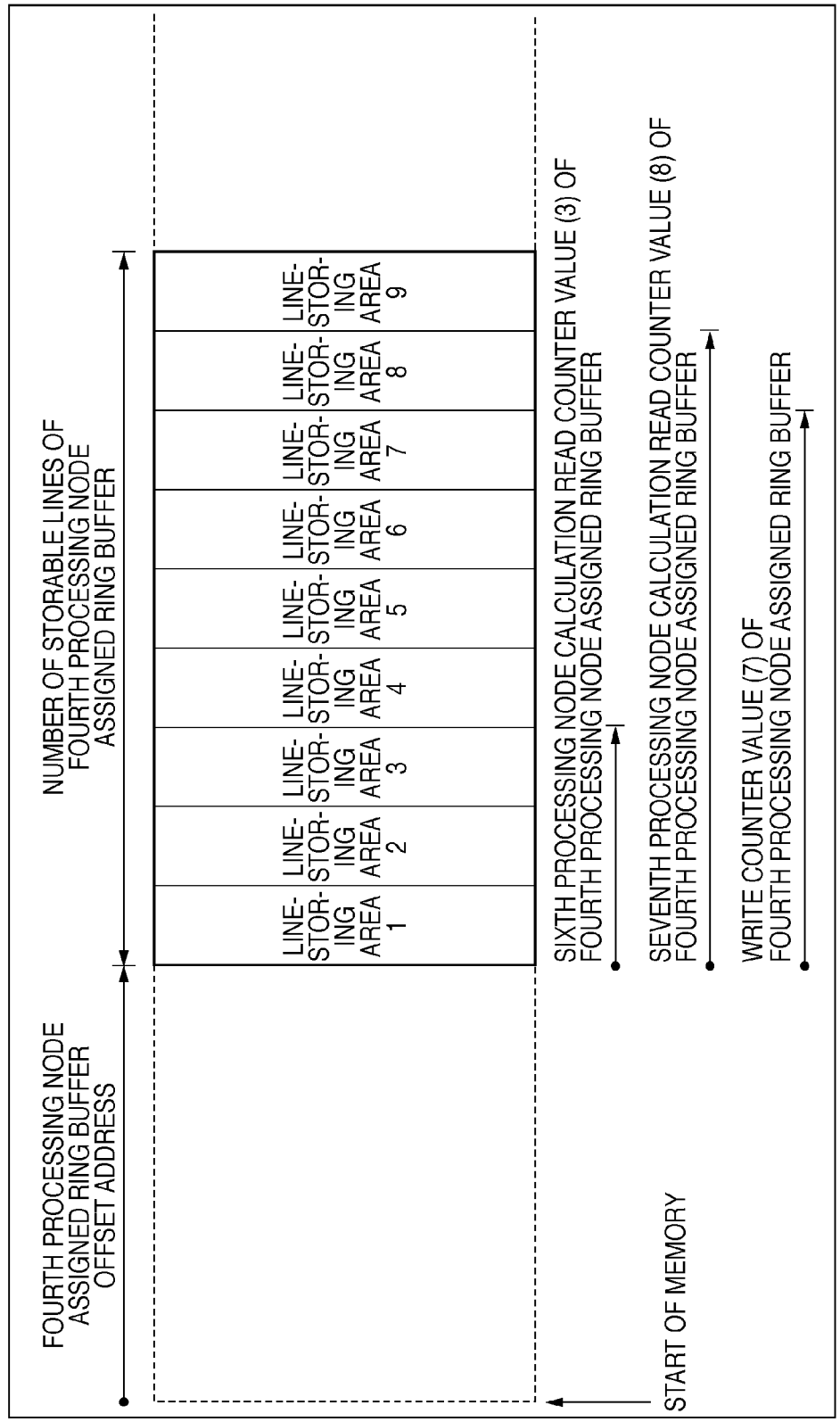
FIG. 7 is a view showing partial memory assignments extracted from those shown in FIG. 5.

FIG. 6 shows a partial network extracted from the hierarchical network shown in FIG. 3 to have the fourth processing node as the center for the sake of simplicity. FIG. 7 shows the relationship between the address calculation parameter storage table 107 and line-storing areas of the ring buffer, for the fourth processing node. In FIG. 7, the fourth processing node assigned ring buffer (in the bold frame) can store image data for nine lines. That is, the fourth processing node assigned ring buffer can store the calculation results of nine unit calculations.

FIG. 7 shows a "read counter value required upon sixth processing node calculation in fourth processing node assigned ring buffer" (to be referred to as "sixth processing node calculation read counter value" hereinafter). The sixth processing node calculation read counter value specifies the data read-out positions when image data stored in the ring buffer assigned to the fourth processing node are used as calculation target pixel data upon making the calculations corresponding to the sixth processing node. For example, when the calculations corresponding to the sixth processing node require calculation target pixel data for five lines, since the current counter value is "3", data for five lines of line-storing areas 3, 4, 5, 6, and 7 are read out from the ring buffer. Note that the sequence for counting up the counter value will be described later in a description of a ring buffer management unit 103.

Likewise, the fourth processing node assigned ring buffer includes a "read counter value required upon seventh processing node calculation in fourth processing node assigned ring buffer" (to be referred to as "seventh processing node calculation read counter value" hereinafter). This seventh processing node calculation read counter value specifies the data read-out positions when image data stored in the ring buffer assigned to the fourth processing node are used as calculation target pixel data upon execution of the calculations corresponding to the seventh processing node. For example, when the calculations corresponding to the seventh processing node require calculation target pixel data for nine lines, since the current counter value is "8", data for nine lines of line-storing areas 8, 9, 1, 2, 3, 4, 5, 6, and 7 are read out from the ring buffer.

In FIG. 7, a "write counter value in fourth processing node assigned processing buffer" specifies the data write positions upon storing calculation result pixel data of the calculations corresponding to the fourth processing node. For example, upon execution of the unit calculation when the current counter value is "7", the unit calculation result is stored in line-storing area 7. Note that the sequence for counting up the counter value will be described later in a description of the ring buffer management unit 103.

The address calculation parameter storage table 107 held by the network composition management unit 102 holds the following pieces of information for each processing node, as shown in FIGS. 8A, 8B and 8C.

Target processing node: A processing node designated as sequence information from the sequence control unit 100 is called a designated processing node. The number of processing nodes is determined in advance based on the network composition of the hierarchical calculations.

Adjacent lower layer processing node: A processing node which is connected to the input side (previous stage) of a certain processing node. The correspondence between processing nodes and adjacent processing nodes is determined in advance based on the network composition of the hierarchical calculations.

Read counter value: This counter value is that having line-storing areas as units with reference to the start position of the ring buffer assigned to the memory 104 (see FIG. 7; examples of counter values are described in parentheses). This value is cyclically updated as the hierarchical calculations progress.

Write counter value: This counter value is that having line-storing areas as units with reference to the start position of the ring buffer assigned to the memory 104 (see FIG. 7; an example of the counter value is described in parentheses). This value is cyclically updated as the hierarchical calculations progress.

Offset address: An address (see FIGS. 5 and 7) indicating the start position of the ring buffer assigned to that processing node in the memory 104. This value is determined in advance based on the network composition of the hierarchical calculations.

Number of storable lines: The number of lines that can be stored in the ring buffer assigned to that processing node in the memory 104.

The number of storable lines is that of an image area required upon execution of the unit calculation in a processing node connected to the output side (subsequent stage) of that processing node (to be referred to as an adjacent upper layer processing node hereinafter). Therefore, the number of storable lines can be equal to or larger than the vertical size of the convolution kernel used upon calculation of the adjacent upper layer processing node, and is determined in advance based on the network composition of the hierarchical calculations. However, if there are a plurality of adjacent upper layer processing nodes, and convolution kernels required upon calculation of these nodes have different sizes, the number of storable lines is equal to or larger than the vertical size of the convolution kernel having the largest vertical size. In case of the fourth processing node shown in FIG. 6, the number of storable lines can be the number of lines of one having a larger vertical size of convolution kernels W_4_6 and W_4_7. FIG. 7 shows a case in which the number of storable lines is "9". Therefore, one having a larger size of W_4_6 and W_4_7 in FIG. 6 has a size equal to or smaller than "9". In this embodiment, assume that the number of storable lines is equal to the vertical size of the convolution kernel (maximum size of the plurality of convolution kernels) used upon calculating the adjacent upper layer processing node for the sake of simplicity.

Number of calculation execution threshold lines: The number of lines of a unit calculation target image area required upon execution of the unit calculation in that processing node. This number of lines can be equal to or larger than the vertical size of the convolution kernel used upon calculating that processing node. In FIG. 6, this number of lines can be equal to or larger than the vertical sizes of convolution kernels W_1_4, W_2_4, and W_3_4. When the vertical sizes of W_1_4, W_2_4, and W_3_4 are different from each other, this number of lines can be equal to or larger than the largest one of these vertical sizes. In this embodiment, assume that the number of calculation execution threshold lines is equal to a maximum one of the vertical sizes of convolution kernels used upon calculating that processing node, for the sake of simplicity.

Referring back to FIG. 2, upon reception of the sequence instruction information from the sequence control unit 100, the network composition management unit 102 checks the address calculation parameter storage table 107, so as to examine the following two items:

(1) unit calculation target image area examination: whether or not data of a unit calculation target image area required for the unit calculation corresponding to the designated processing node specified by the sequence information are available; and (2) unit calculation result write area examination: whether or not the ring buffer assigned to the designated processing node in the memory 104 includes an area in which the unit calculation result is written, and outputs required data to the unit calculation execution determination unit 105.

In order to collect data required for the unit calculation target image area examination, the network composition management unit 102 makes the following operations with respect to the address calculation parameter storage table 107 shown in FIGS. 8A, 8B and 8C.

1. The network composition management unit 102 specifies the adjacent lower layer processing node of the designated processing node (a processing node which is designated by the sequence control unit 100 to execute calculations) (there may be a plurality of adjacent lower layer processing nodes).

2. The unit 102 selects read counter values from the designated processing node and adjacent lower layer processing node (if there are a plurality of adjacent lower layer processing nodes, a plurality of read counter values are also available).

3. The unit 102 selects a write counter value when the adjacent lower layer processing node is selected as a target processing node.

4. The unit 102 selects the number of storable lines when the adjacent lower layer processing node is selected as a target processing node.

5. The unit 102 selects the number of calculation execution threshold lines from the designated processing node.

6. The unit 102 outputs the values selected in items 2, 3, 4, and 5 to the unit calculation execution determination unit 105.

For example, when the fourth processing node is designated by the sequence control unit 100 as the designated processing node, the network composition management unit 102 executes the following operations (see FIGS. 8A, 8B and 8C). Note that a case in which the fourth processing node is designated as the designated processing node will be referred to as "practical example 1" hereinafter. Therefore, the following operations of the network composition management unit 102 are made when an image area as a unit calculation target is examined in practical example 1.

1. The network composition management unit 102 selects the first, second, and third processing nodes as adjacent lower layer processing nodes of the fourth processing node.

2. The unit 102 selects:

a "fourth processing node calculation read counter value (MRA1_4) in first processing node assigned ring buffer" as a read counter value when the fourth processing node is the designated processing node and the first processing node is the adjacent lower layer processing node;

a "fourth processing node calculation read counter value (MRA2_4) in second processing node assigned ring buffer" as a read counter value when the fourth processing node is the designated processing node and the second processing node is the adjacent lower layer processing node; and a "fourth processing node calculation read counter value (MRA3_4) in third processing node assigned ring buffer" as a read counter value when the fourth processing node is the designated processing node and the third processing node is the adjacent lower layer processing node.

3. The unit 102 selects a write counter value when each adjacent lower layer processing node is a target processing node, that is:

a "write counter value (MWA1) in first processing node assigned ring buffer" as a write counter value of the first processing node;

a "write counter value (MWA2) in second processing node assigned ring buffer" as a write counter value of the second processing node; and a "write counter value (MWA3) in third processing node assigned ring buffer" as a write counter value of the third processing node.

4. The unit 102 selects the number of storable lines when the each adjacent lower layer processing node is a target processing node, that is:

"BH1" as the number of storable lines of the first processing node;

"BH2" as the number of storable lines of the second processing node; and

"BH3" as the number of storable lines of the third processing node.

5. The unit 102 selects "WH4" as the number of calculation execution threshold lines of the fourth node.

Figure 11B:
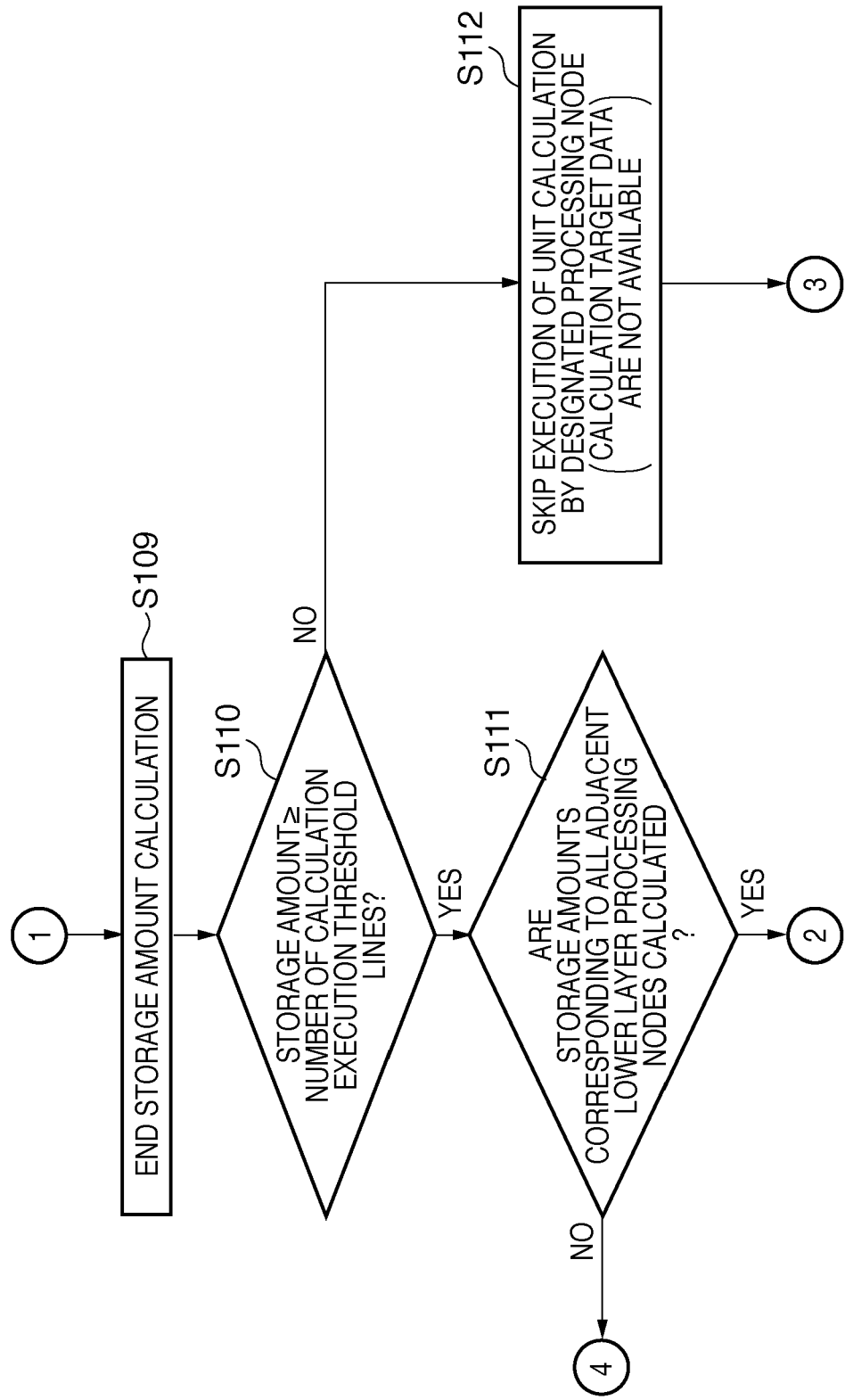

6. The unit 102 outputs the values selected in items 2, 3, 4, and 5 to the unit calculation execution determination unit 105. The unit calculation execution determination unit 105 executes unit calculation execution determination processing to be described later with reference to FIGS. 11A and 11B using these values, and determines whether or not data required for execution of the calculations in the designated processing node are available.

Next, in order to collect data required for the unit calculation result write area examination, the network composition management unit 102 makes the following operations with respect to the address calculation parameter storage table 107.

1. The network composition management unit 102 specifies an adjacent upper layer processing node of the designated processing node (there may be a plurality of adjacent upper layer processing nodes). Specifying the adjacent upper layer processing node of the designated processing node is equivalent to specifying a processing node which has the designated processing node as an adjacent lower layer processing node.

2. The unit 102 selects a read counter value when the adjacent upper layer processing node specified in item 1 is a target processing node and the designated processing node is an adjacent lower layer processing node (if there are a plurality of adjacent upper layer processing nodes, a plurality of read counter values are also available).

3. The unit 102 selects a write counter value of the designated processing node.

4. The unit 102 selects the number of storable lines from the designated processing node.

5. The unit 102 outputs the values selected in items 2, 3, and 4 to the unit calculation execution determination unit 105.

For example, upon examining the unit calculation result write area when the fourth processing node is designated by the sequence control unit 100 as the designated processing node, that is, in practical example 1, the network composition management unit 102 makes the following operations (see FIGS. 8A, 8B and 8C).

1. The unit 102 specifies the sixth and seventh processing nodes as the adjacent upper layer processing nodes of the fourth processing node (specifying adjacent upper layer processing nodes of the fourth processing node is equivalent to finding processing nodes which have the fourth processing node as adjacent lower layer processing nodes).

2. The unit 102 selects a read counter value when each adjacent upper layer processing node (sixth and seventh processing nodes) is a target processing node and the designated processing node (fourth processing node) is an adjacent lower layer processing node. That is, the unit 102 selects:

a "sixth processing node calculation read counter value (MRA4_6) in fourth processing node assigned ring buffer" as a read counter value when the sixth processing node is a target processing node and the fourth processing node is an adjacent lower layer processing node; and a "seventh processing node calculation read counter value (MRA4_7) in fourth processing node assigned ring buffer" as a read counter value when the seventh processing node is a target processing node and the fourth processing node is an adjacent lower layer processing node.

3. The unit 102 selects a "write counter value (MWA4) in fourth processing node assigned ring buffer" as a write counter value of the fourth processing node.

4. The unit 102 selects "BH4" as the number of storable lines of the fourth processing node.

5. The unit 102 outputs the values selected in items 2, 3, and 4 to the unit calculation execution determination unit 105. The unit calculation execution determination unit 105 executes unit calculation result write area examination processing to be described later with reference to FIGS. 12A and 12B using these values, and determines whether or not the ring buffer assigned to the designated processing node includes an area required to hold the calculation execution result in the designated processing node.

Furthermore, upon reception of a unit calculation start instruction from the unit calculation execution determination unit 105 (details of notification will be described later), the network composition management unit 102 outputs address calculation parameters to the ring buffer management unit 103 to give the instruction to calculate addresses. The address calculation parameters to be output to the ring buffer management unit 103 include those to be used when calculation target pixel data are read out from the memory 104 and are supplied to a calculation unit 106, and those to be used when calculation result pixel data are written out from the calculation unit 106 to the memory 104.

Upon reading out calculation target pixel data from the memory 104, the network composition management unit 102 outputs the read counter values, the number of storable lines, and the number of calculation execution threshold lines, which were selected to make the unit calculation target image area examination, to the ring buffer management unit 103. Furthermore, the network composition management unit 102 outputs an offset address selected when the adjacent lower layer processing node is defined as a target processing node to the ring buffer management unit 103.

Upon writing calculation result pixel data in the memory 104, the network composition management unit 102 outputs the write counter value and the number of storable lines, which were selected to make the unit calculation result write area examination, to the ring buffer management unit 103. Also, the network composition management unit 102 outputs an offset address selected from the designated processing node to the ring buffer management unit 103.

Referring to FIG. 2, the ring buffer management unit 103 calculates an address for each line based on the address calculation parameters (address calculation instruction) sent from the network composition management unit 102. The ring buffer management unit 103 outputs the calculated address for each line (ring counter value) and the offset address value to a memory access control unit 110. An offset address setting unit 111 temporarily stores the offset address sent from the network composition management unit 102, and outputs the stored value to the memory access control unit 110. A ring size setting unit 112 temporarily stores the number of storable lines sent from the network composition management unit 102, and outputs the stored value to a ring counter 113. The ring counter 113 loads the read counter value or write counter value sent from the network composition management unit 102, and executes a count-up operation using that value as an initial value.

Upon reading out calculation target pixel data from the memory 104, the number of times that the read counter value is counted up by the ring counter 113 is "vertical size of kernel −1" times of the convolution calculation to be currently calculated. Upon writing the calculation result pixel data in the memory 104, the number of times that the write counter value is counted up by the ring counter 113 is once. The counted up counter value is sent to the network composition management unit 102.

When the counter value has reached a value set in the ring size setting unit 112, it is reset to zero. That is, the maximum value of the counter value is the "value set in the ring size setting unit 112 −1". As described above, the value set in the ring size setting unit 112 upon counting up the read counter value is different from that upon counting up the write counter value. Note that the read counter value is counted up when calculation target pixel data is read out from the memory 104. The write counter value is counted up when calculation result pixel data is written in the memory 104.

Upon reading out calculation target pixel data from the memory 104, the ring counter 113 outputs, as the ring counter value, the initial value and counted up value (to be referred to as values "as many as the vertical size of the kernel" together hereinafter) to the memory access control unit 110. Upon writing calculation result pixel data in the memory 104, the ring counter 113 outputs the initial value to the memory access control unit 110 as the ring counter value.

Furthermore, the ring counter 113 sends a value obtained by counting up the read counter value or write counter value sent from the network composition management unit 102 by one to the network composition management unit 102 as an updated value of the address calculation parameter. Note that the read counter value or write counter value sent from the network composition management unit 102 is an initial value of the ring counter 113. The ring counter 113 updates the count value to zero when the value counted up by one reaches the number of storable lines.

For example, in case of practical example 1 (when the fourth processing node is designated as the designated processing node), when calculation target pixel data are read out from the memory 104, the network composition management unit 102 sends as address calculation parameters, to the ring buffer management unit 103:

MRA1_4, MRA2_4, and MRA3_4 as the read counter values;

BH1, BH2, and BH3 as the numbers of storable lines;

WH4 as the number of calculation execution threshold lines; and

OA1, OA2, and OA3 as offset addresses.

Therefore, the ring buffer management unit 103 sets MRA1_4 in the ring counter 113, BH1 in the ring size setting unit 112, and OA1 in the offset address setting unit 111. The ring counter 113 outputs the ring counter value to the memory access control unit 110 while counting it up (WH4−1) times. As a result, the ring counter 113 outputs values in a number as many as WH4 including the initial value to the memory access control unit 110. Also, the ring buffer management unit 103 sends a value obtained by counting up MRA1_4 by one (=(MRA1_4+1)mod BH1) to the network composition management unit 102 as updated data of MRA1_4 (updated address calculation parameter).

Furthermore, the ring buffer management unit 103 sets MRA2_4 in the ring counter 113, BH2 in the ring size setting unit 112, and OA2 in the offset address setting unit 111, and repeats the same processing as above. Furthermore, the ring buffer management unit 103 sets MRA3_4 in the ring counter 113, BH3 in the ring size setting unit 112, and OA3 in the offset address setting unit 111, and repeats the same processing as above.

On the other hand, for example, in the case of practical example 1 (when the fourth processing node is designated as the designated processing node), when calculation result pixel data are written in the memory 104, the network composition management unit 102 sends, to the ring buffer management unit 103:

MWA4 as the write counter value;

BH4 as the number of storable lines; and

OA4 as the offset address.

Therefore, the ring buffer management unit 103 sets MWA4 in the ring counter 113, BH4 in the ring size setting unit 112, and OA4 in the offset address setting unit 111. Subsequently, the ring buffer management unit 103 outputs the ring counter value to the memory access control unit 110 (only an initial value) while counting up the ring counter 113 once. Also, the ring buffer management unit 103 sends a value obtained by counting up MWA4 by one (=(MWA4+1)mod BH4) to the network composition management unit 102 as updated data of MWA4.

The memory access control unit 110 generates physical addresses based on the ring counter values and offset address value sent from the ring buffer management unit 103. Furthermore, the memory access control unit 110 calculates addresses required to read out calculation target pixel data required for the convolution calculations in the calculation unit 106, and addresses required to store calculation result pixel data.

Figure 9:
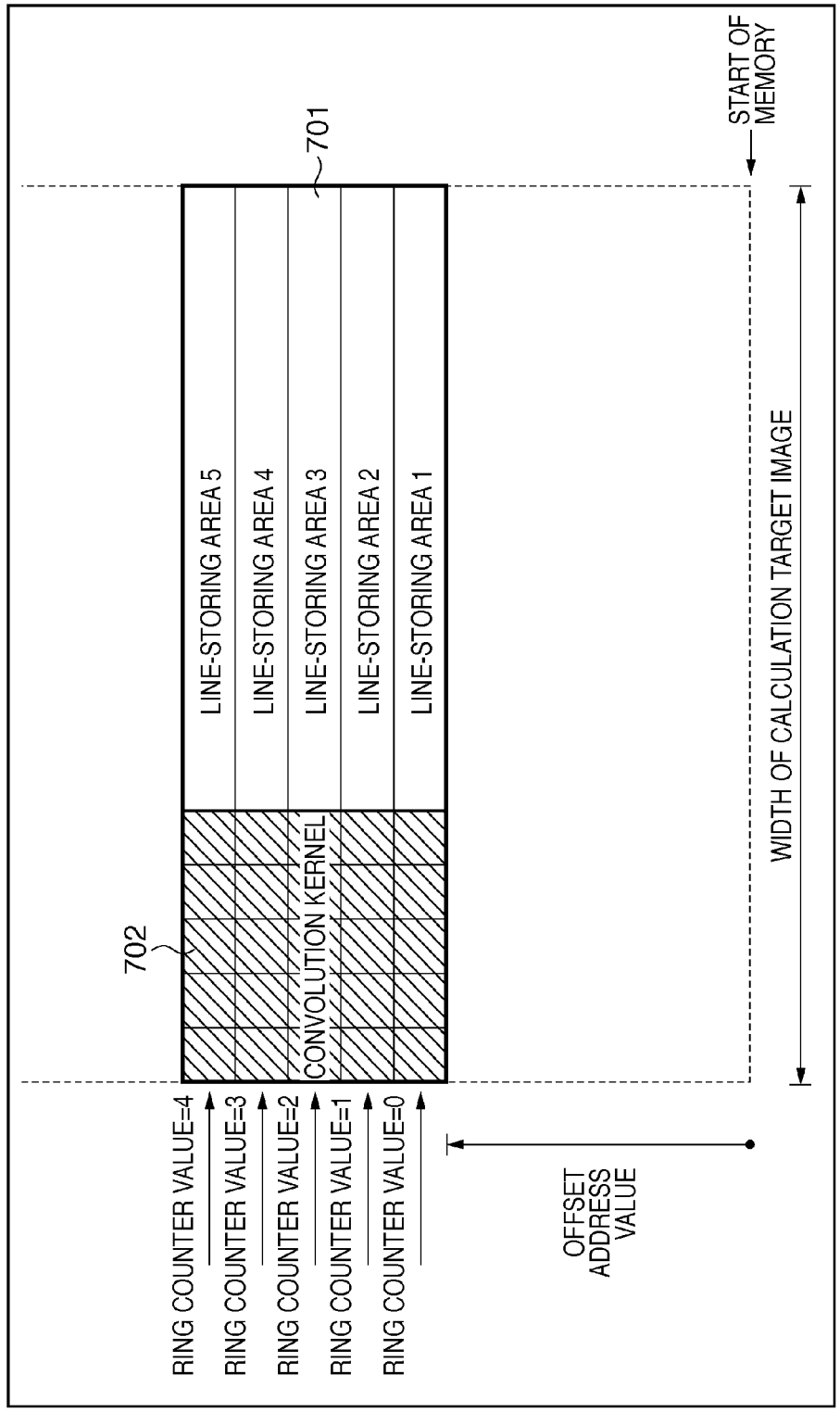
FIG. 9 is a view for explaining read processes of calculation target pixel data.

FIG. 9 is a view for explaining the operation when the memory access control unit 110 reads out calculation target pixel data. In FIG. 9, an area 701 (that in the bold frame) indicates a ring buffer, and an area 702 (hatched area) indicates the size of a convolution kernel (5 pixels×5 pixels in FIG. 9).

The memory access control unit 110 calculates the start addresses of respective line-storing areas of the ring buffer based on the ring counter value and offset address value. Note that the horizontal width of a calculation target image is set in advance. Furthermore, the memory access control unit 110 calculates addresses required to read out pixels required for the convolution calculations from each line-storing area using the start address of that line-storing area. The unit 110 calculates addresses of hatched pixels in FIG. 9, that is, those in the area 702.

For example, assume that ring counter values "2", "3", "4", "0", "1" are sent from the ring buffer management unit 103. The memory access control unit 110 calculates the start address of line-storing area 3 for the ring counter value "2". Furthermore, the unit 110 calculates addresses required to read out pixels of the horizontal size (5) of the convolution kernel from line-storing area 3. After that, the unit 110 repeats the same processing for the ring counter value "3" and subsequent values.

The same applies to a case in which the memory access control unit 110 calculates addresses for storing the calculation result. The memory access control unit 110 generates a read/write control signal and the like, and outputs the calculated addresses and generated control signal to the memory 104. Furthermore, the unit 110 transfers data output from the memory 104 to the calculation unit 106 upon reading, and transfers the calculation result output from the calculation unit 106 to the memory 104 upon writing.

The calculation unit 106 executes the convolution calculations and nonlinear processing for a predetermined data group.

Figure 10:
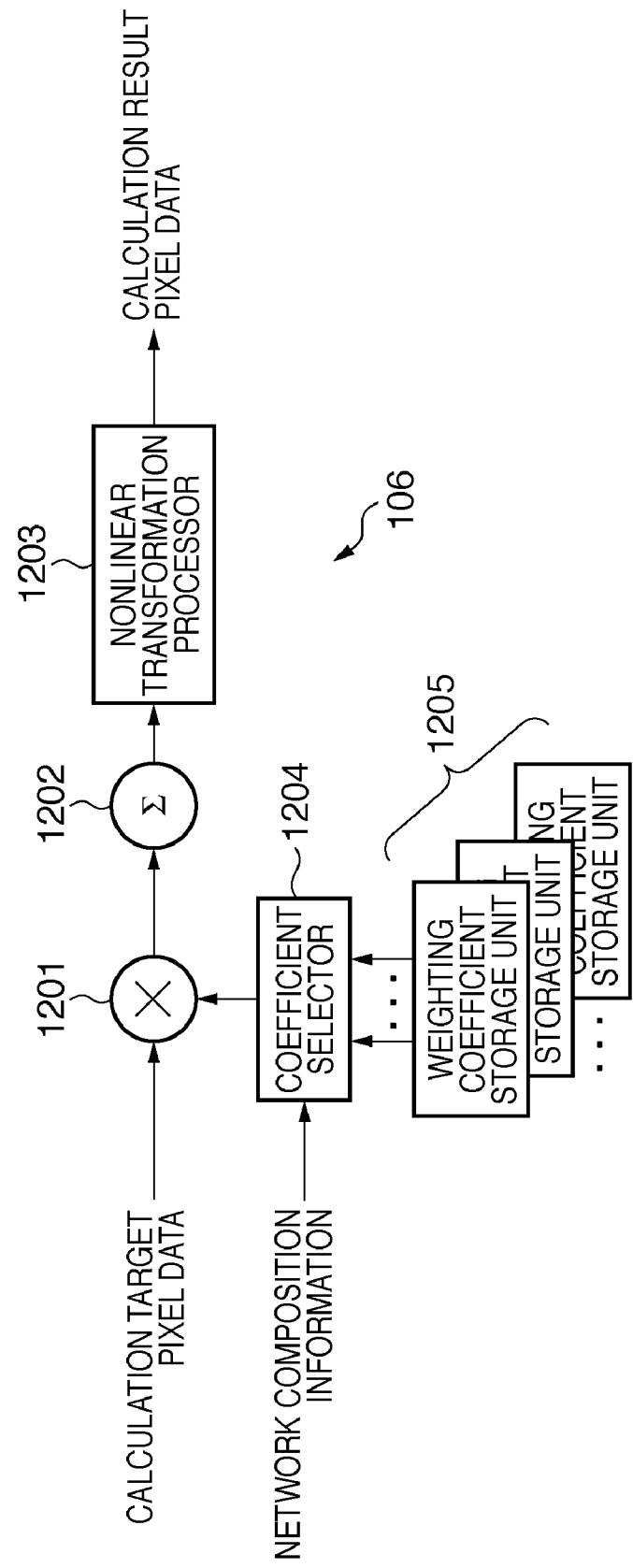
FIG. 10 is a block diagram for explaining an example of the arrangement of a calculation unit.

FIG. 10 is a block diagram showing an example of the calculation unit 106. A multiplier 1201 multiplies a coefficient output from a weighting coefficient set 1205 selected by a coefficient selector 1204 in accordance with the network composition information, and calculation target pixel data input in synchronism with that coefficient, and outputs the product. An accumulation adder 1202 accumulates the output from the multiplier 1201 for a predetermined period of time. A nonlinear transformation processor 1203 nonlinearly transforms the accumulated sum result using a logistic function or tan h function. Note that the nonlinear transformation is implemented by a function table which enumerates predetermined function values.

Referring back to FIG. 2, the unit calculation execution determination unit 105 determines, based on information sent from the network composition management unit 102, whether or not the unit calculation corresponding to the processing node instructed by the sequence control unit 100 can be made. A threshold storage unit 108 stores a threshold used when the unit calculation execution determination unit 105 determines the advisability of the unit calculation. Upon making the unit calculation target image area examination, the threshold storage unit 108 stores the number of calculation execution threshold lines sent from the network composition management unit 102. Upon making the unit calculation result write area examination, the threshold storage unit 108 stores the number of storable lines sent from the network composition management unit 102. A storage amount calculation unit 109 calculates the storage amount of pixel data stored in a predetermined area of the memory 104. The storage amount indicates an amount of pixel data that can be used as a calculation target of those stored in the predetermined area. In this embodiment, a unit of the storage amount is the number of lines for the sake of simplicity.

The unit calculation execution determination processing by the unit calculation execution determination unit 105 will be described below with reference to FIGS. 11A, 11B, 12A and 12B.

For example, in FIG. 7, if none of line-storing areas store any pixel data, the storage amount becomes zero. When the calculation result of the unit calculation is stored in line-storing area 1, the storage amount becomes one line. When the unit calculation is repeated, and the calculation result is stored up to line-storing area 5, the storage amount becomes five lines. At this time, when the adjacent upper layer processing node executes the unit calculation using data in line-storing areas 1 to 5, since data in line-storing area 1 are never used, the storage amount becomes four lines. The storage amount is calculated for each of adjacent upper layer processing nodes if such nodes exist.

That is, the storage amounts of a certain processing node exist as many as the number of adjacent upper layer processing nodes of that processing node, and increase or decrease as follows.

If that processing node executes the unit calculation, the storage amounts corresponding to all the adjacent upper layer processing nodes increase by one line.

If a certain adjacent upper layer processing node of that processing node executes the unit calculation, the storage amount corresponding to that adjacent upper layer processing node decreases by one line.

The storage amount calculation unit 109 calculates storage amounts upon making the unit calculation target image area examination (steps S101 to S111) and upon making the unit calculation result write area examination (steps S201 to S211). In either case, the storage amount is calculated based on the read counter value, write counter value, and the number of storable lines sent from the network composition management unit 102. However, as described above, the read counter value used in the unit calculation target image area examination is that associated with the designated processing node for the adjacent lower layer processing node. Also, the write counter value used in the unit calculation target image area examination is that when the designated processing node is defined as a target processing node. On the other hand, the read counter value used in the unit calculation result write area examination is that when the adjacent upper layer processing node is defined as a target processing node, and the designated processing node is defined as the adjacent lower layer processing node. Also, the write counter value used in the unit calculation result write area examination is that of the designated processing node.

The storage amount calculation processing by the storage amount calculation unit 109 (steps S102 to S109, steps S202 to S209) will be described in detail below. Upon starting the storage amount calculation (step S102, step S202), the storage amount calculation unit 109 compares the read counter value and write counter value (step S103, step S203). If the write counter value is larger, a value obtained by subtracting the read counter value from the write counter value is defined as a storage amount (steps S104 and S105, steps S204 and S205). On the other hand, if the write counter value is smaller, a value obtained by adding the number of storable lines to the write counter value, and then subtracting the read counter value from that sum is defined as a storage amount (steps S104 and S106, steps S204 and S206).

If the write counter value is equal to the read counter value, either the storage amount is zero or the ring buffer is full of data, but these cases are indistinguishable from the write counter value and read counter value. Hence, which of a corresponding write counter and read counter counts last is managed. With this information, when the write counter value is equal to the read counter value, and the write counter counts last, it is determined that the write counter value reaches the read counter value. On the other hand, when the read counter counts last, it is determined that the read counter value reaches the write counter value. Then, the storage amount is calculated by distinguishing whether the write counter value and read counter value are equal to each other since the write counter value reaches the read counter value (in this case, the ring buffer is full of data) (steps S103, S107, and S106, steps S203, 5207, and S206), or the write counter value and read counter value are equal to each other since the read counter value reaches the write counter value (in this case, the storage amount of the ring buffer is zero) (steps S103, S107, and S108, steps S203, S207, and S208).

In this way, a predetermined amount is added to the storage amount when the calculation result of the calculation processing of the corresponding processing node is written in a partial area of the memory. On the other hand, a predetermined amount is subtracted from the storage amount when the calculation processing of a processing node connected to the subsequent stage of the corresponding processing node is completed.

Upon making the unit calculation target image area examination, if there is a plurality of adjacent lower layer processing nodes, storage amounts are calculated in association with ring buffers assigned to these nodes (step S111).

Upon making the unit calculation result write area examination, if there is a plurality of adjacent upper layer processing nodes, storage amounts are calculated for these nodes (step S211).

The unit calculation execution determination unit 105 compares all the storage amounts calculated in the unit calculation target image area examination with the number of calculation execution threshold lines stored in the threshold storage unit 108 (step S110). Furthermore, the unit calculation execution determination unit 105 compares all the storage amounts calculated in the unit calculation result write area examination with the number of storable lines stored in the threshold storage unit 108 (step S210).

If all the storage amounts calculated in the unit calculation target image area examination are larger than or equal to the number of calculation execution threshold lines (step S110), the process advances to step S111. If it is determined in step S111 that storage amounts corresponding to all adjacent lower layer processing nodes are calculated, the process advances to step S201. If all the storage amounts calculated in the unit calculation result write area examination are smaller than the number of storable lines, the process advances to step S213. In this case, since an area that can store the calculation result (storable area) exists in the partial area of the memory, the unit calculation execution determination unit 105 instructs the network composition management unit 102 to start the unit calculation in step S213. Otherwise (NO in step S110 or NO in step S210), the process advances to step S112 or step S212, and the unit calculation execution determination unit 105 gives the instruction to skip the unit calculation. As described above, an area that stores the calculation result that has been referred to by all processing nodes connected to the subsequent stage of a given processing node is sequentially determined as a storable area, and can store a new calculation result. As shown in FIGS. 11A, 11B, 12A and 12B, whether or not the calculation result is stored in the partial area is determined in accordance with the storage state of the calculation result, that is, the storage amount in the partial area of the assigned memory.

For example, in case of practical example 1, when the unit calculation execution determination unit 105 makes the unit calculation target image area examination, it receives, from the network composition management unit 102:

MRA1_4, MRA2_4, and MRA3_4 as read counter values;
MWA1, MWA2, and MWA3 as write counter values;
BH1, BH2, and BH3 as the numbers of storable lines; and
WH4 as the number of calculation execution threshold lines.

Therefore, a storage amount is calculated from a set [MRA1_4, MWA1, BH1], and storage amounts are respectively calculated from sets [MRA2_4, MWA2, BH2] and [MRA3_4, MWA3, BH3]. Furthermore, all the calculated storage amounts are compared with WH4, thus examining the presence/absence of required calculation target data of the unit calculation target image area.

On the other hand, for example, in case of practical example 1, when the unit calculation execution determination unit 105 makes the unit calculation result write area examination, it receives, from the network composition management unit 102:

MRA4_6 and MRA4_7 as read counter values;
MWA4 as a write counter value; and
BH4 as the number of storable lines.

Therefore, a storage amount is calculated from a set [MRA4_6, MWA4, BH4], and a storage amount is similarly calculated from a set [MRA4_7, MWA4, BH4]. Furthermore, all the calculated storage amounts are compared with BH4, thus examining the presence/absence of an area that can store the calculation result of the unit calculation.

As has been described in detail above, according to the first embodiment, calculations to be made by respective processing nodes are divided into predetermined unit calculations, and are executed to have each unit calculation as a unit. For this reason, each processing node of a middle layer need only assure a memory that stores calculation results required to make the unit calculations by its upper layer processing nodes. Therefore, according to the first embodiment, when the results of calculations made by processing nodes of a certain layer are used as inputs of calculations of upper layer processing nodes, the required memory size can be reduced. That is, a memory size required to hold temporal calculation results (intermediate results) of input layer processing nodes or middle layer processing nodes can be reduced.

Since the unit calculation execution unit 101 cyclically designates processing nodes that make unit calculations, as soon as the calculation results of lower layer processing nodes required for the unit calculation to be made by a certain processing node are available, the unit calculation is executed. Furthermore, an upper layer processing node immediately executes the unit calculation, and the calculation result which was used in that unit calculation and is no longer required is discarded (an area which stores that calculation result is defined as an overwritable area, that is, an area which can store a new calculation result). The first embodiment realizes the effective use of the memory by such memory control.

As described above, according to the first embodiment, calculations to be made by respective processing nodes are divided into predetermined unit calculations, and as soon as calculation results of a lower layer required for the unit calculation to be made by a certain processing nodes are available, the unit calculation is executed. As a result, an intermediate calculation buffer of a hierarchical calculation apparatus of the convolutional neural network and the like can be configured by minimum ring buffers for respective logical processing nodes in accordance with the network composition.

Second Embodiment

In the first embodiment, the calculation results of middle layer processing nodes are stored in predetermined assigned ring buffers of the memory 104, and are always cyclically overwritten during hierarchical calculations. Therefore, after completion of the hierarchical calculations, the calculation results of the middle layer processing nodes cannot be used for other processing.

In the second embodiment, under the assumption that the calculation result of a certain middle layer processing node is used for another processing after completion of the hierarchical calculations, only the calculation result of that processing node is transferred to another area before it is overwritten.

Figure 13:
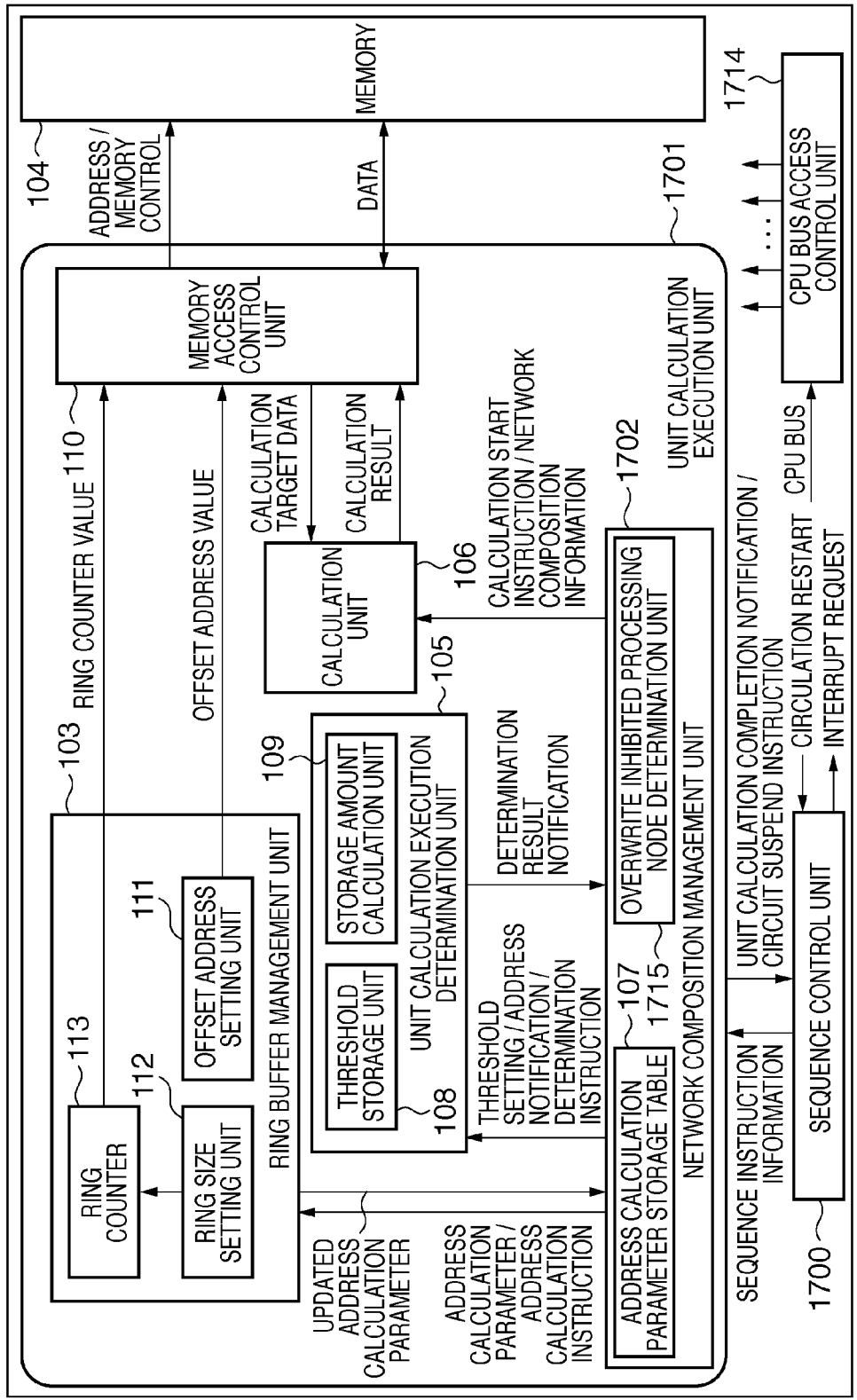
FIG. 13 is a block diagram for explaining an example of the arrangement of a hierarchical calculation processing apparatus according to the second embodiment.
Figure 14:
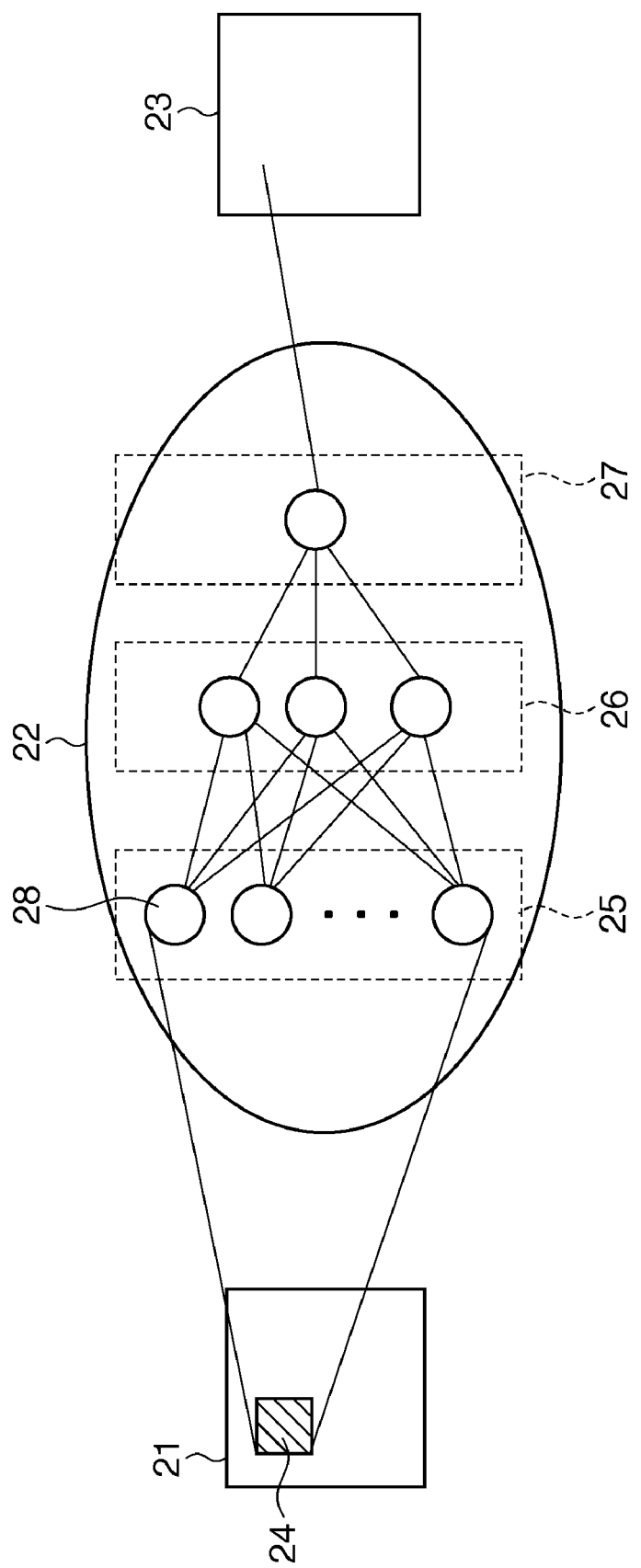
FIG. 14 is a view for explaining an example of the composition of a layer-interconnected neural network.
Figure 15:
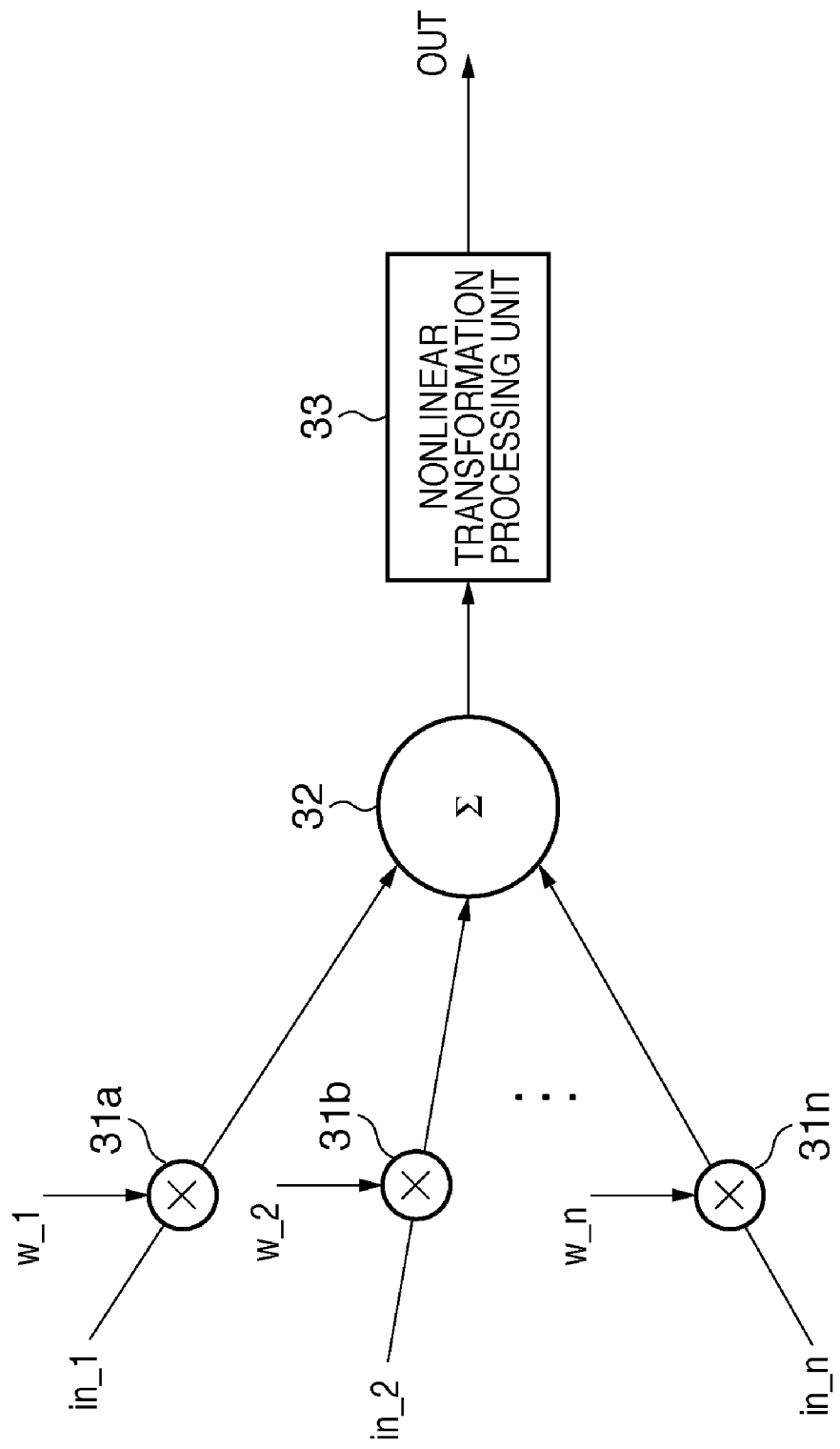
FIG. 15 is a view showing an example of the arrangement of a neuron.
Figure 16:
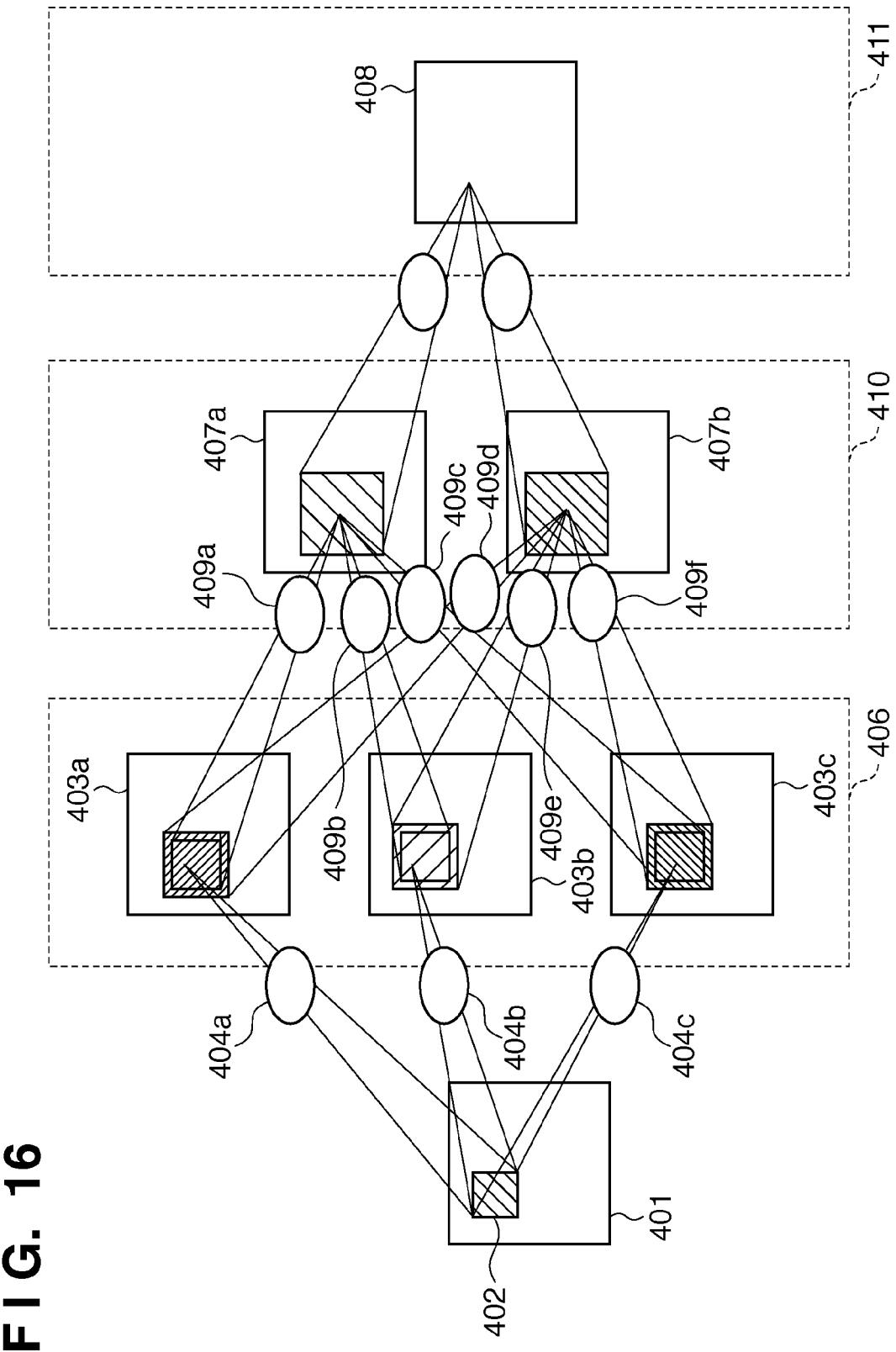
FIG. 16 is a view for explaining an example of the network composition of Convolutional Neural Networks (CNN)
Figure 17:
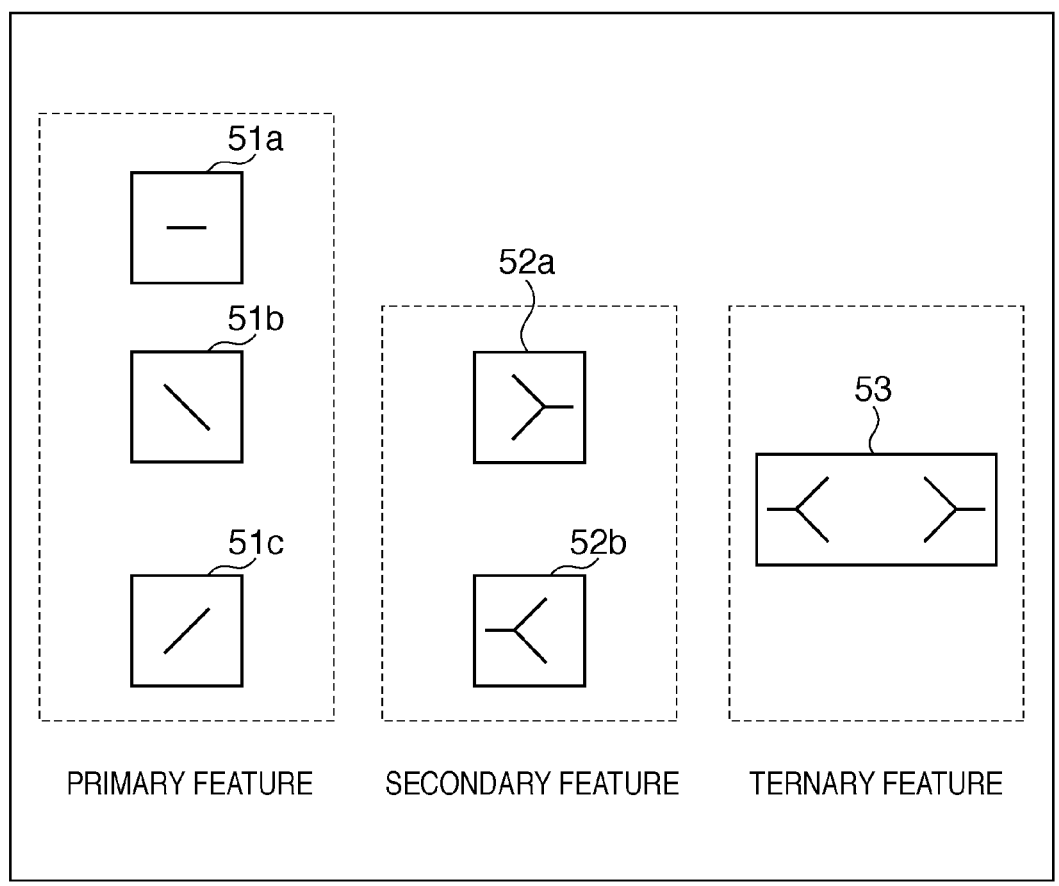
FIG. 17 is a view for explaining an example of feature extraction of the CNN.

FIG. 13 is a block diagram showing an example of the arrangement of a hierarchical calculation processing apparatus according to the second embodiment. In FIG. 13, components denoted by the same reference numerals in FIG. 2 make the same operations as those in the first embodiment, and a repetitive description thereof will be avoided. In this embodiment, components that make operations different from the first embodiment will be mainly described.

Referring to FIG. 13, a CPU bus access control unit 1714 has, in addition to the operation of the CPU bus access control unit 114 of the first embodiment:

a function of notifying the CPU 68 of an interrupt request from a sequence control unit 1700; and a function of notifying the sequence control unit 1700 of a circulation restart instruction from the CPU 68.

The sequence control unit 1700 has, in addition to the functions of the sequence control unit 100 of the first embodiment, a function of suspending the output of the next sequence instruction information upon reception of a circulation suspend instruction from a unit calculation execution unit 1701. Furthermore, upon reception of a circulation restart instruction from the CPU bus access control unit 1714 in the suspended state, the sequence control unit 1700 restarts the output of the sequence instruction information.

The unit calculation execution unit 1701 has the following function in addition to those of the unit calculation execution unit 101 of the first embodiment. That is, the unit calculation execution unit 1701 has a function of issuing a circulation suspend instruction to the sequence control unit 1700 upon reception of a suspend request of the output of sequence instruction information of the sequence control unit 1700 from a network composition management unit 1702.

The network composition management unit 1702 has the following function in addition to those of the network composition management unit 102 of the first embodiment. That is, the network composition management unit 1702 has a function of issuing a suspend request of the output of sequence instruction information from the sequence control unit 1700 in response to an instruction from an overwrite inhibited processing node determination unit 1715. Upon notification of address calculation parameter update information from the ring buffer management unit 103, the network composition management unit 1702 notifies the overwrite inhibited processing node determination unit 1715 of that information.

In the overwrite inhibited processing node determination unit 1715, processing nodes, the calculation results of which are inhibited from being overwritten, are registered in advance. Furthermore, upon receiving, from the ring buffer management unit 103, notification of an updated value of a write counter value corresponding to the registered processing node (to be referred to as an overwrite inhibited processing node hereinafter), the overwrite inhibited processing node determination unit 1715 checks if the updated value is zero. When the updated value of the write counter value is zero, this means that a result is stored in the start line-storing area of a ring buffer in the next unit calculation of this processing node. Therefore, the calculation result stored so far (stored in the first line-storing area of the ring buffer) is likely to be overwritten. Hence, upon notification of 0 as the updated value of the write counter value, the overwrite inhibited processing node determination unit 1715 issues a request for suspending the output of sequence instruction information to the sequence control unit 1700 (circulation suspend instruction).

With the above arrangement, before the calculation result corresponding to the overwrite inhibited processing node is overwritten in the ring buffer, the calculations are suspended. During the suspended state, the calculation result stored so far can be read out from the ring buffer assigned to the overwrite inhibited processing node of the memory 104, and can be transferred to another location (another memory area).

For example, upon reception of an interrupt request from the sequence control unit 1700, the CPU 68 can read out the calculation result stored so far from the ring buffer assigned to the overwrite inhibited processing node of the memory 104, and transfer it to the RAM 70. After completion of the required processing, the CPU 68 issues a circulation restart instruction to the sequence control unit 1700 to restart the hierarchical calculations.

With the above processing, the calculation results of middle layer processing nodes can be used for another processing.

Other Embodiments

In the first and second embodiments, the method of cyclically using predetermined continuous areas of the memory 104 for respective lines using the ring counter has been described. However, the present invention is not limited to such specific memory use method. For example, a method of executing processing while assigning discontinuous areas for predetermined processing units with reference to a memory address table corresponding to the ring counter or the like may be used. That is, the ring buffer specified in the present invention is not limited to a ring buffer of the narrow sense or a cyclic buffer.

In the first and second embodiments, the case in which the feature extraction result is held at the same resolution as the input layer has been exemplified. However, the present invention can be similarly applied to a configuration in which feature planes (calculation results) are sub-sampled with respect to an input plane.

In the first and second embodiments, the sequence control for respective lines as the most efficient processing unit has been explained. However, the present invention is not limited to such specific control. The present invention can be applied to sequence control for respective units not more than one line or for respective blocks, and the arrangement in such case is known to those who are skilled in the art.

Furthermore, in the first and second embodiments, calculations for one row in the horizontal direction are defined as a unit calculation. However, the present invention is not limited to this. For example, calculations for one column in the vertical direction may be defined as a unit calculation. In either the horizontal or vertical direction, the unit calculation is not limited to calculations for one row (or one column). For example, calculations for two rows in the horizontal directions may be defined as a unit calculation.

In the first and second embodiments described above, the case in which the present invention is applied to the convolutional network has been explained. However, the present invention is not limited to this. The present invention can be applied to various kinds of hierarchical calculation processing that require a predetermined reference area in calculation results of the previous stage.

In the first embodiment, the case in which the present invention is applied to the CNN calculations has been described. However, the present invention is not limited to this. The present invention can also be applied to hierarchical processing of various other two-dimensional calculations other than the convolution calculations.

The embodiments have been explained in detail. The present invention can adopt embodiments in the forms of, for example, a system, apparatus, method, program, storage medium, and the like. More specifically, the present invention may be applied to either a system configured by a plurality of device, or an apparatus consisting of a single device.

Note that the above embodiments have explained the hardware implementation of the CNN calculation unit. However, the present invention can be applied to its software implementation. Therefore, the present invention includes a case wherein the functions of the aforementioned embodiments are achieved when a software program is directly or remotely supplied to a system or apparatus, and a computer of that system or apparatus reads out and executes the supplied program code. The program to be supplied in this case is a computer program corresponding to each illustrated flowchart in the embodiments.

Therefore, the program code itself installed in a computer to implement the functional processing of the present invention using the computer implements the present invention. Put differently, the present invention includes the computer program itself for implementing the functional processing of the present invention.

In this case, the form of program is not particularly limited, and an object code, a program to be executed by an interpreter, script data to be supplied to an OS, and the like may be used as long as they have the functions of the program.

As a computer-readable storage medium for supplying the program, the following media can be used. For example, a Floppy® disk, hard disk, optical disk, magneto-optical disk, MO, CD-ROM, CD-R, CD-RW, magnetic tape, nonvolatile memory card, ROM, DVD (DVD-ROM, DVD-R), and the like can be used.

As another program supply method, the user establishes a connection to a homepage on the Internet using a browser on a client computer, and downloads the computer program of the present invention from the homepage onto a recording medium such as a hard disk or the like. In this case, the program to be downloaded may be a compressed file including an automatic installation function. Also, the program code that forms the program of the present invention may be segmented into a plurality of files, which may be downloaded from different homepages. That is, the present invention includes a WWW server which makes a plurality of users download a program file required to implement the functional processing of the present invention by the computer.

Also, a storage medium such as a CD-ROM or the like, which stores the encrypted program of the present invention, may be delivered to the user. In this case, the user who has cleared a predetermined condition may be allowed to download key information used to decrypt the encrypted program from a homepage via the Internet. The user executes the encrypted program using the downloaded key information to install the program on a computer.

The functions of the aforementioned embodiments can be implemented when the computer executes the readout program. Furthermore, the functions of the aforementioned embodiments can be implemented in cooperation with an OS or the like running on the computer based on an instruction of that program. In this case, the OS or the like executes some or all of actual processes, which implement the functions of the aforementioned embodiments.

Furthermore, some or all of the functions of the aforementioned embodiments may be implemented when the program read out from the recording medium is written in a memory equipped on a function expansion board or a function expansion unit, which is inserted into or connected to the computer. In this case, after the program is written in the function expansion board or unit, a CPU equipped on the function expansion board or function expansion unit executes some or all of actual processes based on an instruction of that program.

According to the present invention, hierarchical calculation processing such as CNN calculations and the like based on a spatial allocation relationship can be implemented by a small memory size.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-156734, filed on Jun. 13, 2007, which is hereby incorporated by reference herein in its entirety.

The invention claimed is:

1. A calculation processing apparatus, which executes calculation processing based on a network composed by hierarchically connecting a plurality of processing nodes, said apparatus comprising:
   a processor and a memory, said processor and said memory cooperating to function as:
   a memory control unit configured to assign a partial area of a memory to each of the plurality of processing nodes, store a calculation result of each processing node in a storable area of the partial area assigned to that processing node, and set, as storable areas, areas that store the calculation results whose reference by all processing nodes connected to a subsequent stage of that processing node is complete;
   a designation unit configured to designate a processing node, which is to execute calculation processing, of the plurality of processing nodes;
   a determination unit configured to determine, based on storage states of calculation results in partial areas of the memory assigned to the processing node designated by said designation unit and to processing nodes connected to a previous stage of the designated processing node, whether or not to execute a calculation of the designated processing node; and
   an execution unit configured to, when said determination unit determines that the calculation is executed, control to execute calculation processing corresponding to the designated processing node.

2. The apparatus according to claim 1, wherein said determination unit determines that the calculation corresponding to the designated processing node is executed
   when partial areas of the memory assigned to processing nodes connected to the previous stage of the designated processing node store calculation results required for a calculation of the designated processing node, and
   when an area that can store a calculation result of the designated processing node exists in a partial area of the memory assigned to the designated processing node.

3. The apparatus according to claim 1, wherein said determination unit determines whether or not to execute the calculation of the designated processing node by comparing storage amounts of calculation results stored in the partial areas of the memory assigned to the processing nodes connected to the previous stage of the designated processing node with a threshold set in advance for the designated processing node, and
   a predetermined amount is added to the storage amount when a calculation result of calculation processing of a corresponding processing node is written in a corresponding partial area of the memory, and a predetermined amount is subtracted from the storage amount when calculation processing of a processing node connected to the subsequent stage of the corresponding processing node is completed.

4. The apparatus according to claim 1, wherein each of the plurality of processing nodes executes a unit calculation for processing data of a predetermined amount smaller than all processing target input data in response to a single designation by said designation unit, and calculations for all the processing target input data are implemented by repeating the unit calculation.

5. The apparatus according to claim 4, wherein the calculation processing by each of the plurality of processing nodes is a calculation for generating two-dimensional output data from two-dimensional input data, and the unit calculation is a calculation for outputting data for one line of the two-dimensional output data.

6. The apparatus according to claim 4, wherein said memory control unit stores the calculation result of the unit calculation by cyclically overwriting an assigned partial area of the memory.

7. The apparatus according to claim 1, wherein the memory has a continuous address space, and is shared when different subspaces of the continuous address space are assigned to the plurality of processing nodes.

8. The apparatus according to claim 1, wherein the calculation processing of the network is calculation processing of a convolutional neural network.

9. The apparatus according to claim 1, further comprising a suspend unit configured to, when, in a partial area of the memory corresponding to one processing node of the plurality of processing nodes, reference to all calculation results stored in all areas in the partial area by all processing nodes connected to the subsequent stage of that processing node is complete, suspend the calculations of the network so as to execute predetermined processing for the calculation results stored in the partial area.

10. The apparatus according to claim 9, wherein the predetermined processing is processing for transferring the calculation results stored in the partial area to another memory area.

11. A method of controlling a calculation processing apparatus, which executes calculation processing based on a network composed by hierarchically connecting a plurality of processing nodes, said method comprising:

a memory control step of assigning a partial area of a memory to each of the plurality of processing nodes, storing a calculation result of each processing node in a storable area of the partial area assigned to that processing node, and setting, as storable areas, areas that store the calculation results whose reference by all processing nodes connected to a subsequent stage of that processing node is complete;

a designation step of designating a processing node, which is to execute calculation processing, of the plurality of processing nodes;

a determination step of determining, based on storage states of calculation results in partial areas of the memory assigned to the processing node designated in the designation step and to processing nodes connected to a previous stage of the designated processing node, whether or not to execute a calculation of the designated processing node; and an execution step of controlling, when it is determined in the determination step that the calculation is executed, to execute calculation processing corresponding to the designated processing node.

12. The method according to claim 11, wherein it is determined in the determination step that the calculation corresponding to the designated processing node is executed when partial areas of the memory assigned to processing nodes connected to the previous stage of the designated processing node store calculation results required for a calculation of the designated processing node, and when an area that can store a calculation result of the designated processing node exists in a partial area of the memory assigned to the designated processing node.

13. The method according to claim 11, wherein whether or not to execute the calculation of the designated processing node is determined in the determination step by comparing storage amounts of calculation results stored in the partial areas of the memory assigned to the processing nodes connected to the previous stage of the designated processing node with a threshold set in advance for the designated processing node, and a predetermined amount is added to the storage amount when a calculation result of calculation processing of a corresponding processing node is written in a corresponding partial area of the memory, and a predetermined amount is subtracted from the storage amount when calculation processing of a processing node connected to the subsequent stage of the corresponding processing node is completed.

14. The method according to claim 11, wherein each of the plurality of processing nodes executes a unit calculation for processing data of a predetermined amount smaller than all processing target input data in response to a single designation in the designation step, and calculations for all the processing target input data are implemented by repeating the unit calculation.

15. The method according to claim 14, wherein the calculation processing by each of the plurality of processing nodes is a calculation for generating two-dimensional output data from two-dimensional input data, and the unit calculation is a calculation for outputting data for one line of the two-dimensional output data.

16. The method according to claim 14, wherein in the memory control step, the calculation result of the unit calculation is stored by cyclically overwriting an assigned partial area of the memory.

17. The method according to claim 11, wherein the memory has a continuous address space, and is shared when different subspaces of the continuous address space are assigned to the plurality of processing nodes.

18. The method according to claim 11, further comprising a suspend step of suspending, when, in a partial area of the memory corresponding to one processing node of the plurality of processing nodes, reference to all calculation results stored in all areas in the partial area by all processing nodes connected to the subsequent stage of that processing node is complete, the calculations of the network so as to execute predetermined processing for the calculation results stored in the partial area.

19. The method according to claim 18, wherein the predetermined processing is processing for transferring the calculation results stored in the partial area to another memory area.

20. A non-transitory computer readable medium storing a program for making a computer execute a control method according to claim 11.

* * * * *